US011783199B2

(12) United States Patent
Chen et al.

(10) Patent No.: US 11,783,199 B2
(45) Date of Patent: Oct. 10, 2023

(54) IMAGE DESCRIPTION INFORMATION GENERATION METHOD AND APPARATUS, AND ELECTRONIC DEVICE

(71) Applicant: TENCENT TECHNOLOGY (SHENZHEN) COMPANY LIMITED, Shenzhen (CN)

(72) Inventors: Chen Chen, Shenzhen (CN); Shuai Mou, Shenzhen (CN); Wanpeng Xiao, Shenzhen (CN); Qi Ju, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 431 days.

(21) Appl. No.: 17/082,002

(22) Filed: Oct. 27, 2020

(65) Prior Publication Data

US 2021/0042579 A1   Feb. 11, 2021

Related U.S. Application Data

(63) Continuation of application No. PCT/CN2019/111946, filed on Oct. 18, 2019.

(30) Foreign Application Priority Data

Nov. 30, 2018  (CN) .......................... 201811460241.9

(51) Int. Cl.
*G06N 3/08*       (2023.01)
*G06N 3/088*      (2023.01)
(Continued)

(52) U.S. Cl.
CPC .......... *G06N 3/088* (2013.01); *G06F 18/214* (2023.01); *G06F 18/2132* (2023.01);
(Continued)

(58) Field of Classification Search
CPC .......... G06N 3/088; G06N 3/045; G06N 3/08; G06N 3/044; G06N 3/006; G06F 18/2132;
(Continued)

(56) References Cited

U.S. PATENT DOCUMENTS 11,281,938 B2 *  3/2022  Liu .......................... G06N 3/08
2016/0358024 A1  12/2016  Krishnakumar et al.
2018/0260698 A1   9/2018  Lin et al.

FOREIGN PATENT DOCUMENTS

CN  106844442 A  *  6/2017  ............. G06F 16/51
CN  106844442 A     6/2017
(Continued)

OTHER PUBLICATIONS

The World Intellectual Property Organization (WIPO) International Search Report for PCT/CN2019/111946 dated Jan. 16, 2020 6 Pages (including translation).
(Continued)

*Primary Examiner* — Juan A Torres
(74) *Attorney, Agent, or Firm* — ANOVA LAW GROUP, PLLC

(57) ABSTRACT

An image description information generation method includes obtaining a to-be-processed target image, and inputting the target image into a target-image description information generation network. The target-image description information generation network is a generation network that is obtained by performing adversarial training using a plurality of sample images and that is configured to generate image description information, the adversarial training is training an initialized image description information generation network and an initialized discriminative network alternately, and the discriminative network is configured to discriminate an output result of the image description information generation network. The method also includes
(Continued)

according to the output result of the target-image description information generation network, generating target-image description information used for describing the target image.

17 Claims, 8 Drawing Sheets

(51) Int. Cl.
   *G06F 18/214* (2023.01)
   *G06F 18/2132* (2023.01)
   *G06N 3/045* (2023.01)
   *G06V 10/764* (2022.01)
   *G06V 10/82* (2022.01)
(52) U.S. Cl.
   CPC .............. *G06N 3/045* (2023.01); *G06N 3/08* (2013.01); *G06V 10/764* (2022.01); *G06V 10/82* (2022.01)
(58) Field of Classification Search
   CPC ........ G06F 18/214; G06F 18/22; G06F 18/24; G06V 10/82
   USPC .......................................................... 382/159
   See application file for complete search history.

(56) References Cited

FOREIGN PATENT DOCUMENTS

| | | | | | |
|---|---|---|---|---|---|
| CN | 107133354 | A | | 9/2017 | |
| CN | 107330444 | A | * | 11/2017 | ........... G06F 16/583 |
| CN | 107330444 | A | | 11/2017 | |
| CN | 107451994 | A | | 12/2017 | |
| CN | 108334497 | A | * | 7/2018 | |
| CN | 108334497 | A | | 7/2018 | |
| CN | 108564550 | A | * | 9/2018 | ............. G06T 5/002 |
| CN | 108564550 | A | | 9/2018 | |
| CN | 109685116 | A | | 4/2019 | |

OTHER PUBLICATIONS

Junhua Mao et al., "Explain Images with Multimodal Recurrent Neural Networks," arXiv preprint arXiv:1410.1090, Oct. 4, 2014. 9 pages.
Oriol Vinyals et al., "Show and Tell: A Neural Image Caption Generator," Proceedings of the IEEE Conference on Computer Vision and Pattern Recognition (CVPR), 2015, pp. 3156-3164. 9 pages.
Kelvin Xu et al., "Show, Attend and Tell: Neural Image Caption Generation with Visual Attention," arXiv preprint arXiv:1502.03044, Apr. 19, 2016. 22 pages.
Peter Anderson et al., "Bottom-Up and Top-Down Attention for Image Captioning and Visual Question Answering," Proceedings of the IEEE Conference on Computer Vision and Pattern Recognition (CVPR), 2018, pp. 6077-6086. 10 pages.
Jiuxiang Gu et al., "Stack-Captioning: Coarse-to-fine learning for image captioning," arXiv preprint arXiv:1709.03376, Mar. 14, 2018. 8 pages.
Siqi Liu et al., "Improved Image Captioning via Policy Gradient Optimization of SPIDEr," Proceedings of the IEEE International Conference on Computer Vision (ICCV), 2017, pp. 873-881. 9 pages.
Daqing Liu et al., "Context-Aware Visual Policy Network for Sequence-Level Image Captioning," arXiv preprint arXiv:1808.05864, Aug. 22, 2018. 9 pages.
Jiasen Lu et al., "Knowing When to Look: Adaptive Attention via a Visual Sentinel for Image Captioning," Proceedings of the IEEE Conference on Computer Vision and Pattern Recognition (CVPR), 2017, pp. 375-383. 9 pages.
Steven J. Rennie et al., "Self-Critical Sequence Training for Image Captioning," Proceedings of the IEEE Conference on Computer Vision and Pattern Recognition (CVPR), 2017, pp. 7008-7024. 17 pages.
Wenhao Jiang et al., "Recurrent Fusion Network for Image captioning," Proceedings of the European Conference on Computer Vision (ECCV), 2018. 17 pages.
Ting Yao et al., "Boosting Image Captioning With Attributes," Proceedings of the IEEE International Conference on Computer Vision (ICCV), 2017, pp. 4894-4902. 9 pages.
Li Zhang et al., "Actor-Critic Sequence Training for Image Captioning," arXiv preprint arXiv:1706.09601, Nov. 28, 2017. 10 pages.
China National Intellectual Property Administration (CNIPA) Office Action 1 for 201811460241.9 dated Sep. 19, 2022 10 Pages (including translation).
The European Patent Office (EPO) The Extended European Search Report for 19891662.9 dated Dec. 23, 2021 10 Pages.
Bei Liu et al., "Beyond Narrative Description: Generating Poetry from Images by Multi-Adversarial Training," arxiv.org, arXiv:1804.08473v2, Apr. 25, 2018. 13 pages.
Shiyang Yan et al.,"Image Captioning Base on a Hierarchical Attention Mechanism and Policy Gradient Optimization," arxiv.org, arXiv:1811.05253v1, Nov. 13, 2018. 13 pages.
Rakshith Shetty et al., "Speaking the Same Language: Matching Machine to Human Captions by Adversarial Training," arxiv.org, arXiv:1703.10476v1, Mar. 30, 2017. 16 pages.

* cited by examiner

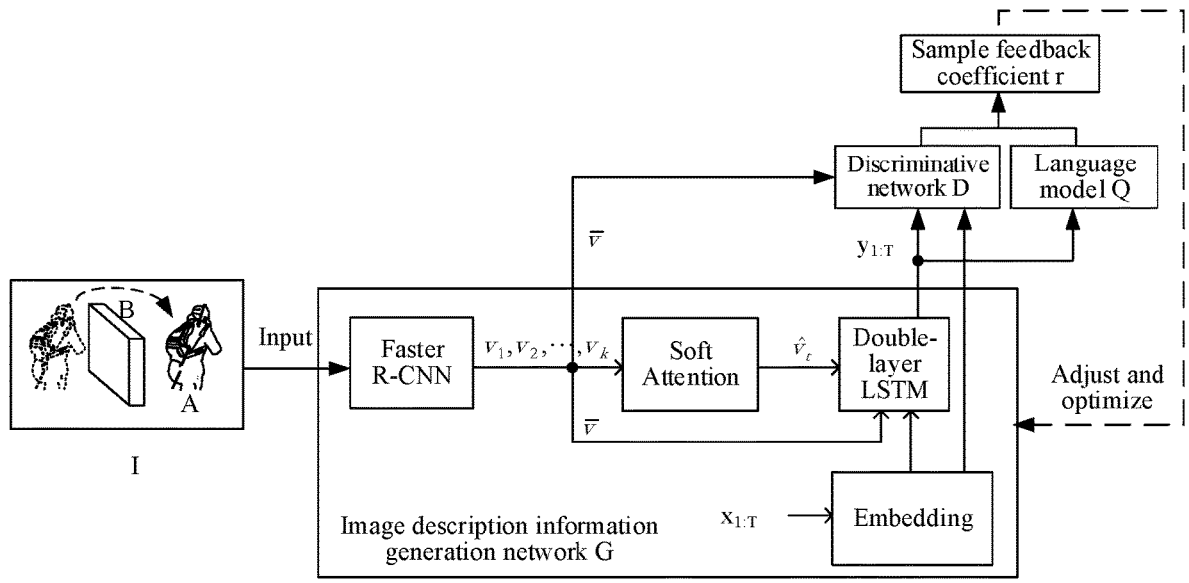

FIG. 9

|  | M1 | | M2 | | M3 | | M4 | | M5 | |
|---|---|---|---|---|---|---|---|---|---|---|
|  | $\rho$ | p-value | $\rho$ | p-value | $\rho$ | p-value | $\rho$ | p-value | $\rho$ | p-value |
| Bleu-1 | 0.24 | (0.369) | 0.29 | (0.271) | 0.72 | (0.002) | -0.54 | (0.030) | 0.44 | (0.091) |
| Bleu-4 | 0.05 | (0.862) | 0.10 | (0.703) | 0.58 | (0.018) | -0.63 | (0.010) | 0.39 | (0.265) |
| ROUGE-L | 0.15 | (0.590) | 0.20 | (0.469) | 0.65 | (0.006) | -0.55 | (0.030) | 0.38 | (0.142) |
| METEOR | 0.53 | (0.036) | 0.57 | (0.022) | 0.86 | (0.000) | -0.10 | (0.710) | 0.74 | (0.001) |
| CIDEr | 0.43 | (0.097) | 0.47 | (0.070) | 0.81 | (0.000) | -0.21 | (0.430) | 0.65 | (0.007) |
| SPICE-exact | 0.84 | (0.000) | 0.86 | (0.000) | 0.90 | (0.000) | 0.39 | (0.060) | 0.95 | (0.000) |
| SPICE | 0.88 | (0.000) | 0.89 | (0.000) | 0.89 | (0.000) | 0.46 | (0.070) | 0.97 | (0.000) |

| M1 | Percentage of captions evaluated as better or equal to human caption. |
|---|---|
| M2 | Percentage of captions that pass the Turing Test. |
| M3 | Average correctness of the captions on a scale 1-5 (incorrect - correct). |
| M4 | Average detail of the captions from 1-5 (lacking details - very detailed). |
| M5 | Percentage of captions that are similar to human description. |

FIG. 10

| Generator | Discriminator | BLEU-1 | BLEU-2 | BLEU-3 | BLEU-4 | METEOR | ROUGE-L | CIDEr | SPICE | CNN-D | RNN-D |
|---|---|---|---|---|---|---|---|---|---|---|---|
| resnet101+att2in (Rennie et al. 2017) | none* | - | - | - | 33.3 | 26.3 | 55.3 | 111.4 | - | - | - |
| | CNN-GAN | 78.1 | 61.3 | 46.4 | 34.4 | 26.6 | 56.1 | 112.3 | 20.3 | 47.9 | 45.8 |
| | RNN-GAN | 78.0 | 61.4 | 46.3 | 34.3 | 26.5 | 56.0 | 112.2 | 20.4 | 46.0 | 48.1 |
| | ensemble | 78.5 | 61.8 | 47.1 | 35.0 | 27.1 | 56.6 | 114.8 | 20.5 | 48.0 | 48.2 |
| bottom-up+att2in (Rennie et al. 2017) | none | 79.0 | 62.1 | 48.2 | 35.5 | 27.0 | 56.3 | 117.0 | 20.9 | 45.6 | 44.5 |
| | CNN-GAN | 80.1 | 63.8 | 49.0 | 37.0 | 27.9 | 57.7 | 118.0 | 21.4 | 51.2 | 49.7 |
| | RNN-GAN | 80.0 | 63.9 | 49.1 | 36.8 | 27.8 | 57.6 | 118.1 | 21.3 | 49.5 | 51.9 |
| | ensemble | 80.5 | 64.8 | 50.0 | 37.9 | 28.4 | 58.2 | 119.5 | 21.5 | 51.4 | 51.5 |
| resnet101+att2all (Rennie et al. 2017) | none* | - | - | - | 34.2 | 26.7 | 55.7 | 114.0 | - | - | - |
| | CNN-GAN | 78.4 | 62.6 | 47.6 | 35.4 | 27.4 | 56.8 | 115.2 | 20.6 | 49.0 | 47.2 |
| | RNN-GAN | 78.3 | 62.5 | 47.6 | 35.2 | 27.3 | 56.9 | 115.1 | 20.6 | 47.1 | 48.8 |
| | ensemble | 79.0 | 62.8 | 48.2 | 35.8 | 27.7 | 57.6 | 117.8 | 20.9 | 49.5 | 49.1 |
| bottom-up+att2all (Rennie et al. 2017) | none | 79.6 | 63.5 | 49.1 | 36.1 | 27.8 | 56.7 | 119.8 | 21.2 | 46.3 | 45.9 |
| | CNN-GAN | 80.7 | 64.7 | 50.1 | 38.0 | 28.4 | 58.4 | 122.1 | 21.9 | 53.5 | 50.8 |
| | RNN-GAN | 80.6 | 64.8 | 50.0 | 38.1 | 28.3 | 58.3 | 122.0 | 21.8 | 50.6 | 53.2 |
| | ensemble | 81.1 | 65.7 | 50.8 | 39.0 | 28.6 | 58.7 | 124.1 | 22.0 | 53.7 | 53.5 |
| resnet101+top-down (Anderson et al. 2018) | none* | 76.6 | - | - | 34.0 | 26.5 | 54.9 | 111.1 | 20.2 | - | - |
| | CNN-GAN | 78.5 | 62.7 | 48.0 | 35.6 | 27.3 | 56.7 | 113.0 | 20.6 | 49.5 | 47.6 |
| | RNN-GAN | 78.4 | 62.7 | 48.0 | 35.5 | 27.2 | 56.6 | 112.7 | 20.5 | 47.0 | 49.2 |
| | ensemble | 79.3 | 63.2 | 48.6 | 36.0 | 27.6 | 57.1 | 115.5 | 20.8 | 50.0 | 49.3 |
| bottom-up+top-down (Anderson et al. 2018) | none* | 79.8 | - | - | 36.3 | 27.7 | 56.9 | 120.1 | 21.4 | - | - |
| | CNN-GAN | 81.1 | 65.0 | 50.4 | 38.3 | 28.6 | 58.6 | 123.2 | 22.1 | 53.6 | 51.1 |
| | RNN-GAN | 81.0 | 64.8 | 50.2 | 38.2 | 28.5 | 58.4 | 122.2 | 22.0 | 50.9 | 54.0 |
| | ensemble | 81.8 | 66.1 | 51.6 | 39.6 | 28.9 | 59.1 | 125.9 | 22.3 | 54.3 | 54.5 |
| Average Improvements | CNN-GAN | 1.71 | 2.31 | 1.85 | 4.44 | 2.59 | 2.53 | 1.50 | 2.75 | 13.93 | 11.17 |
| | RNN-GAN | 1.59 | 2.47 | 1.85 | 4.15 | 2.22 | 2.38 | 1.28 | 2.27 | 8.92 | 16.26 |

FIG. 11

| Algorithms | BLEU-1 | | BLEU-2 | | BLEU-3 | | BLEU-4 | | METEOR | | ROUGE-L | | CIDEr | | SPICE | |
|---|---|---|---|---|---|---|---|---|---|---|---|---|---|---|---|---|
| | C5 | c40 | C5 | c40 | C5 | c40 | C5 | c40 | C5 | c40 | C5 | c40 | C5 | c40 | C5 | c40 |
| Google-NIC (Vinyals et al. 2015) | 71.3 | 89.5 | 54.2 | 80.2 | 40.7 | 69.4 | 30.9 | 58.7 | 25.4 | 34.6 | 53.0 | 68.2 | 94.3 | 94.6 | 18.2 | 63.6 |
| PG-BCMR (Liu et al. 2017) | 75.4 | 91.8 | 59.1 | 84.1 | 44.5 | 73.8 | 33.2 | 62.4 | 25.7 | 34.0 | 55.0 | 69.5 | 101.3 | 103.2 | 18.7 | 62.2 |
| Adaptive (Lu et al. 2017) | 74.8 | 92.0 | 58.4 | 84.5 | 44.4 | 74.4 | 33.6 | 63.7 | 26.4 | 35.9 | 55.0 | 70.5 | 104.2 | 105.9 | 19.7 | 67.3 |
| Actor-Critic (Zhang et al. 2017) | 77.8 | 92.9 | 61.2 | 85.5 | 45.9 | 74.5 | 33.7 | 62.5 | 26.4 | 34.4 | 55.4 | 69.1 | 110.2 | 112.1 | 20.3 | 68.0 |
| SCST:Att2all (Rennie et al. 2017) | 78.1 | 93.7 | 61.9 | 86.0 | 47.0 | 75.9 | 35.2 | 64.5 | 27.0 | 35.5 | 56.3 | 70.7 | 114.7 | 116.7 | 20.7 | 68.9 |
| Stack-Cap (Gu et al. 2017) | 77.8 | 93.2 | 61.6 | 86.1 | 46.8 | 76.0 | 34.9 | 64.6 | 27.0 | 35.6 | 56.2 | 70.6 | 114.8 | 118.3 | - | - |
| LSTM-A3 (Yao et al. 2017) | 78.7 | 93.7 | 62.7 | 86.7 | 47.6 | 76.5 | 35.6 | 65.2 | 27.0 | 35.4 | 56.4 | 70.5 | 116.0 | 118.0 | - | - |
| Up-Down (Anderson et al. 2018) | 80.2 | 95.2 | 64.1 | 88.8 | 49.1 | 79.4 | 36.9 | 68.5 | 27.6 | 36.7 | 57.1 | 72.4 | 117.9 | 120.5 | 21.5 | 71.5 |
| CAVP (Liu et al. 2018) | 80.1 | 94.9 | 64.7 | 88.8 | 50.0 | 79.7 | 37.9 | 69.0 | 28.1 | 37.0 | 58.2 | 73.1 | 121.6 | 123.8 | - | - |
| RFNet (Jiang et al. 2018) | 80.4 | 95.0 | 64.9 | 89.3 | 50.1 | 80.1 | 38.0 | 69.2 | 28.2 | 37.2 | 58.2 | 73.1 | 122.9 | 125.1 | - | - |
| Ours | 81.9 | 95.6 | 66.3 | 90.1 | 51.7 | 81.7 | 39.6 | 71.5 | 28.7 | 38.2 | 59.0 | 74.4 | 123.1 | 124.3 | - | - |

FIG. 12

IMAGE DESCRIPTION INFORMATION GENERATION METHOD AND APPARATUS, AND ELECTRONIC DEVICE

RELATED APPLICATION

This application is a continuation application of PCT Patent Application No. PCT/CN2019/111946, filed on Oct. 18, 2019, which claims priority to Chinese Patent Application No. CN201811460241.9, entitled "IMAGE DESCRIPTION INFORMATION GENERATION METHOD AND APPARATUS, AND ELECTRONIC DEVICE" filed with the National Intellectual Property Administration, PRC on Nov. 30, 2018, content of all of which is incorporated herein by reference in its entirety.

FIELD OF THE TECHNOLOGY

This application relates to the field of computer technologies and, specifically, to an image description information generation method and apparatus, and an electronic device.

BACKGROUND

Currently, to accurately recognize content included in an image, an image description generating algorithm is usually adopted to automatically generate image description information matching the content in the image. A commonly used generation manner is implemented by using an encoder-decoder structure, in which a convolutional neural network (CNN) is used as an encoder, to encode image information from a pixel space to a hidden space, and then a recurrent neural network (RNN) is used as a decoder, to decode encoded image information in the hidden space to a language space.

However, although image description information generated by using the foregoing structure can express content in an image, quality of a sentence used in the image description information cannot be ensured. For example, the sentence is hardly smooth, or does not conform to daily oral expression habits. In other words, there is a problem that generation quality is relatively low in an image description information generation method provided in the related art.

The disclosed methods and systems are directed to solve one or more problems set forth above and other problems.

SUMMARY

Embodiments of the present disclosure provide an image description information generation method and apparatus, and an electronic device, to resolve at least a technical problem that generation quality is relatively low in an image description information generation method provided in the related art.

According to an aspect of the present disclosure, an image description information generation method is provided. The method includes obtaining a to-be-processed target image, and inputting the target image into a target-image description information generation network. The target-image description information generation network is a generation network that is obtained by performing adversarial training using a plurality of sample images and that is configured to generate image description information, the adversarial training is training an initialized image description information generation network and an initialized discriminative network alternately, and the discriminative network is configured to discriminate an output result of the image description information generation network. The method also includes according to the output result of the target-image description information generation network, generating target-image description information used for describing the target image.

According to another aspect of the present disclosure, an electronic device is further provided. The electronic device includes a memory storing computer program instructions, and a processor coupled to the memory. When executing the computer program instructions, the processor is configured to perform: obtaining a to-be-processed target image; inputting the target image into a target-image description information generation network, wherein the target-image description information generation network is a generation network that is obtained by performing adversarial training using a plurality of sample images and that is configured to generate image description information, the adversarial training is training an initialized image description information generation network and an initialized discriminative network alternately, and the discriminative network is configured to discriminate an output result of the image description information generation network; and according to the output result of the target-image description information generation network, generating target-image description information used for describing the target image.

According to another aspect of the present disclosure, a non-transitory computer-readable storage medium is provided. The non-transitory computer-readable storage medium stores computer program instructions executable by at least one processor to perform: obtaining a to-be-processed target image; inputting the target image into a target-image description information generation network, wherein the target-image description information generation network is a generation network that is obtained by performing adversarial training using a plurality of sample images and that is configured to generate image description information, the adversarial training is training an initialized image description information generation network and an initialized discriminative network alternately, and the discriminative network is configured to discriminate an output result of the image description information generation network; and according to the output result of the target-image description information generation network, generating target-image description information used for describing the target image.

Other aspects of the present disclosure can be understood by those skilled in the art in light of the description, the claims, and the drawings of the present disclosure.

BRIEF DESCRIPTION OF THE DRAWINGS

The accompanying drawings described herein are used for providing further understanding for the present disclosure and constitute a part of the present disclosure. Disclosed embodiments of the present disclosure and descriptions thereof are used for explaining the present disclosure and do not limit the present disclosure. In the accompanying drawings:

FIG. 9 is a schematic diagram of still another image description information generation method according to an embodiment of the present disclosure;

FIG. 10 is a schematic diagram of evaluation indexes of an image description information generation method according to an embodiment of the present disclosure;

FIG. 11 is a schematic effect diagram of an image description information generation method according to an embodiment of the present disclosure;

FIG. 12 is a schematic effect diagram of another image description information generation method according to an embodiment of the present disclosure;

DETAILED DESCRIPTION

Figure 1:
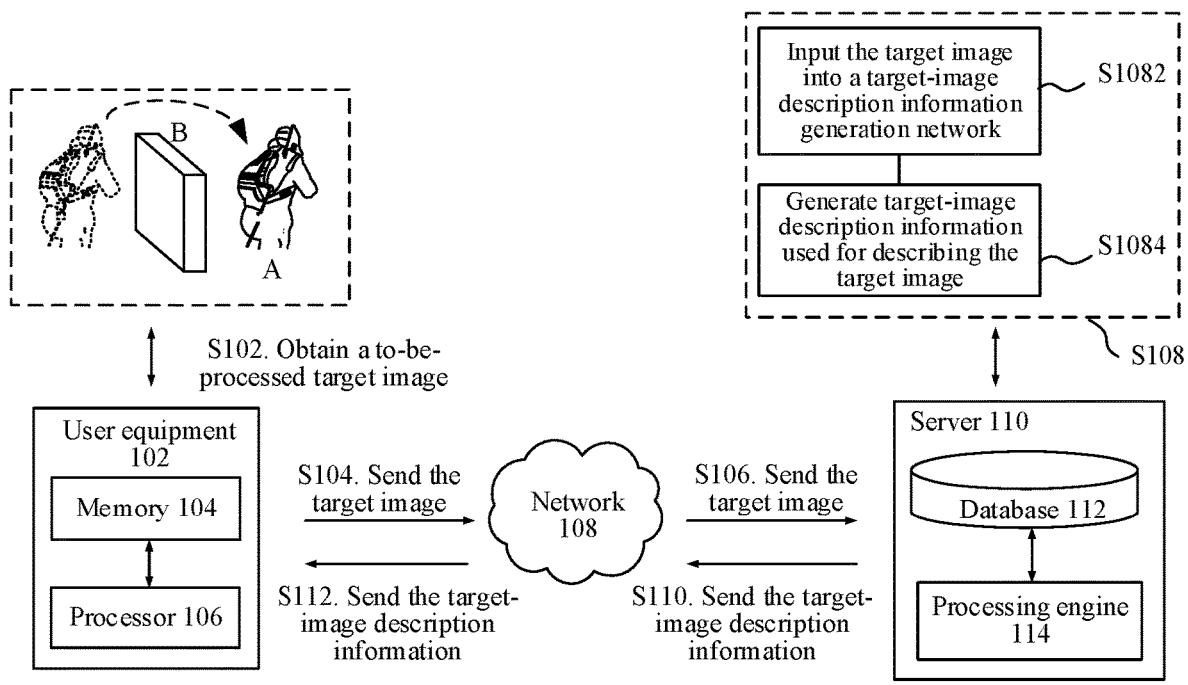
FIG. 1 is a schematic diagram of a hardware environment of an image description information generation method according to an embodiment of the present disclosure.

To make a person skilled in the art better understand solutions of the present disclosure, the technical solutions in embodiments of the present disclosure are described below with reference to the accompanying drawings. Apparently, the described embodiments are merely some rather than all of embodiments of the present disclosure. Other embodiments obtained by a person of ordinary skill in the art based on the disclosed embodiments of the present disclosure without creative efforts shall fall within the protection scope of the present disclosure.

The terms such as "first" and "second" in the specification, claims, and accompanying drawings of the present disclosure that are intended to distinguish between similar objects rather than describe a particular sequence or a chronological order. It is to be understood that the data termed in such a way are interchangeable in proper circumstances, so that the embodiments of the present disclosure described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

For describing the foregoing image description information generation method, the embodiments of the present disclosure relate to the following technical terms:

CNN: convolutional neural network, for extracting an image feature in an image.

RNN: recurrent neural network, for language modeling and learning a context feature.

R-CNN: region-based CNN, for target detection and positioning.

Faster R-CNN: an improved version of R-CNN, having a higher speed.

RPN: region proposal network, which is a module in a faster R-CNN, and used for extracting an eigenvector of a box in which an object possibly exists.

LSTM: long-short term memory, which can learn a relationship in a long term and is a most widely applied RNN.

CNN-RNN structure: a general framework of an image description algorithm in which a CNN is used as en encoder, and an RNN is used as a decoder.

Attention mechanism: weighted calculation on input features in RNN modeling.

Self-critical: a reinforcement learning method based on a policy gradient.

Policy gradient: a method in reinforcement learning, in which each updated policy is directly learned.

GAN: generative adversarial net, which is a game-type generation network in which no sample probability distribution needs to be preset, where a generator is a generator in a GAN, and a discriminator is a discriminator in a GAN.

BLEU: bilingual evaluation understudy, which is a bilingual translation quality evaluation auxiliary tool, mainly used for quality evaluation of machine translation.

ROUGE: recall-oriented understudy for gisting evaluation, which is standard for evaluating quality of a text digest or summary.

METEOR: a standard for evaluating quality of a translation in any language.

CIDEr: consensus-based image description evaluation, which is a standard for evaluating quality of image description.

SPICE: semantic propositional image caption evaluation, which is a semantics-based standard for evaluating quality of image description.

MS COCO: a Microsoft common objects in context dataset, which is used in key point detection, target detection, image description, and the like.

Visual Genome: a dataset of dense annotations of images.

MLE: maximum likelihood estimation, which is used for estimating a parameter of a probability model, and is a training manner of an RNN.

According to one aspect of the embodiments of the present disclosure, an image description information generation method is provided. In an embodiment, the image description information generation method may be applied to a hardware environment shown in FIG. 1.

As shown in FIG. 1, through step S102, user equipment 102 obtains a to-be-processed target image. The target image includes a character object A and a wall object B. A memory 104 in the user equipment 102 stores the target image, and a processor 106 sends the target image to a server 110 by using a network 108, as shown in steps S104 to S106.

The server 110 performs step S108 by using a processing engine 114: as shown in step S1082, the received target image is inputted into a target-image description information generation network; and as shown in step S1084, target-image description information used for describing the target image is generated. The target-image description information generation network is a generation network that is obtained after adversarial training performed by using a plurality of sample images obtained from a database 112 and that is configured to generate image description information. The adversarial training is alternate training that is performed based on an initialized image description information generation network and an initialized discriminative network that match the target-image description information generation network. The discriminative network is configured to discriminate an output result of the image description information generation network.

For the target image shown in FIG. 1, the target-image description information may be "the character object A has crossed over the wall object B". Then the server 110 sends, by using the network 108, the generated target-image description information to the user equipment 102 for presentation, as shown in steps S110 and S112.

In the image description information generation method provided in this embodiment, after a to-be-processed target image is obtained, the target image is inputted into a target-image description information generation network obtained through adversarial training, and target-image description information matching the target image is generated by using the target-image description information generation network. The adversarial training is alternate training that is performed based on an initialized image description information generation network and an initialized discriminative network that match the target-image description information generation network.

In other words, image description information of an image is no longer generated by using a CNN-RNN structure provided in the related art, and instead a target-image description information generation network that is obtained based on adversarial training is used. A discriminative network is introduced in an adversarial training process, to discriminate an output result of the image description information generation network; and the image description information generation network and the discriminative network are trained alternately, to implement reinforcement learning of a finally generated target-image description information generation network. Therefore, comprehensive optimization of evaluation indexes of image description information generated by using the target-image description information generation network is implemented, thereby improving generation quality of the image description information, and resolving a problem that generation quality is relatively low in the related art.

Optionally, the image description information generation method may be applied to a terminal device having functions such as image acquisition, image recognition, or image processing. The terminal device may be user equipment, for example, a terminal such as a mobile phone, a tablet computer, a notebook computer, or a PC, or may be a server such as a data processing server or a distributed processing server. Further, the image description information generation method may be implemented on an independent terminal device.

To be specific, the terminal device directly obtains the to-be-processed target image, and generates the target-image description information of the target image by using the target-image description information generation network, to reduce generation delay problems caused by data transmission, thereby improving generation efficiency. In addition, the image description information generation method may alternatively be implemented through data exchange on at least two terminal devices.

As shown in FIG. 1, the to-be-processed target image is obtained in the user equipment 102, then the target image is sent to the server 112 by using the network 108; the target-image description information generation network in the server generates the target-image description information of the target image, and the generated target-image description information is returned to the user equipment 102. Therefore, a generation process of the image description information is completed through data exchange, thereby reducing processing burdens of the user equipment. The network 108 may include a wireless network or a wired network. The wireless network includes: Bluetooth, Wi-Fi, and another network implementing wireless communication. The wired network may include, but not limited to: a wide area network, a metropolitan area network, and a local area network.

Figure 2:
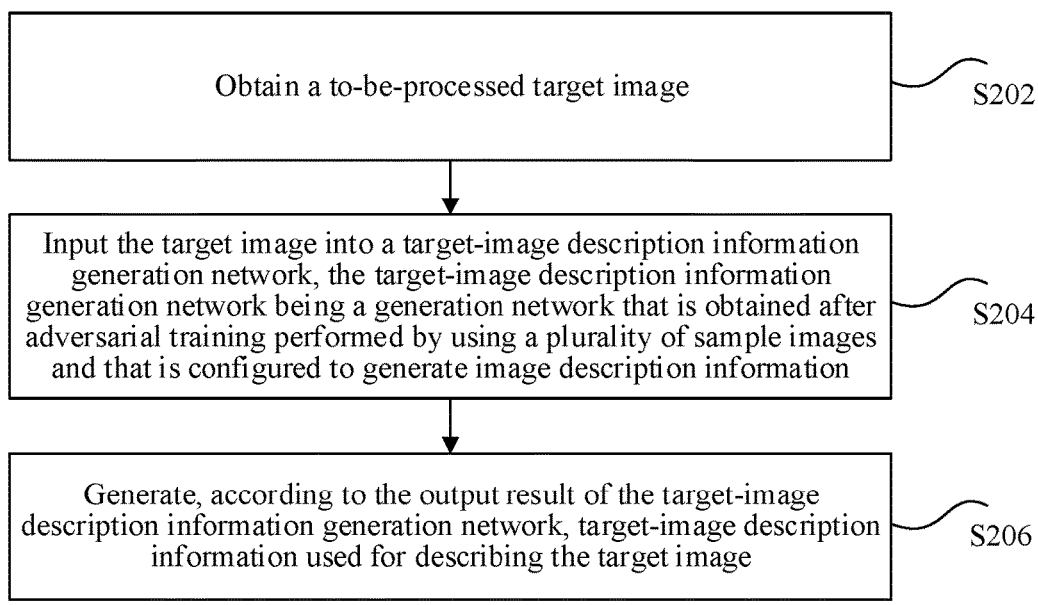
FIG. 2 is a schematic flowchart of an image description information generation method according to an embodiment of the present disclosure.

In an embodiment, as shown in FIG. 2, the image description information generation method includes the followings.

S202: Obtain a to-be-processed target image.

S204: Input the target image into a target-image description information generation network. The target-image description information generation network may be a generation network that is obtained after adversarial training performed by using a plurality of sample images and that is configured to generate image description information. The adversarial training may be alternate training that is performed based on an initialized image description information generation network and an initialized discriminative network that match the target-image description information generation network. The discriminative network may be configured to discriminate an output result of the image description information generation network.

S206: Generate, according to the output result of the target-image description information generation network, target-image description information used for describing the target image.

In one embodiment, the image description information generation method may be applied to various scenarios, such as an image recognition scenario, an image retrieval scenario, and an image verification scenario, in which image description information matching image content presented in an image needs to be obtained.

By using the image verification scenario as an example, after a to-be-verified target image is obtained, the target image is inputted into a target-image description information generation network obtained through adversarial training, and target-image description information matching the target image is generated by using the target-image description information generation network. Further, information verification is performed on the target-image description information of which generation quality has been improved, to determine whether the target image passes the verification, thereby ensuring accuracy of image verification. The foregoing scenario is merely an example, and no limitation is intended.

Figure 3:
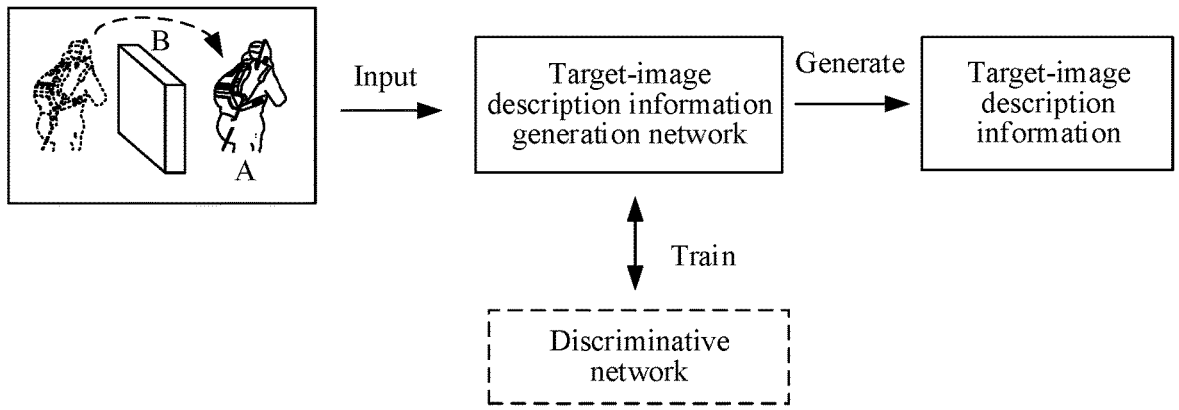
FIG. 3 is a schematic diagram of an image description information generation method according to an embodiment of the present disclosure.

For example, as shown in FIG. 3, after a target image is obtained, the target image is inputted into a target-image description information generation network, to generate target-image description information matching the target image. The target-image description information generation network is a generation network that is obtained after adversarial training performed by using a newly introduced discriminative network and that is configured to image description information. In the example shown in FIG. 3, the target-image description information generated by the target-image description information generation network may be as follows: "a character object A", "crosses over", and "a wall object B". The description herein is merely an example, and no limitation is imposed in one embodiment.

In one embodiment, before the obtaining a to-be-processed target image, the method further includes: constructing the initialized image description information generation network and the initialized discriminative network; and performing adversarial training of the initialized image description information generation network and the initialized discriminative network, to obtain the target-image description information generation network.

Figure 4:
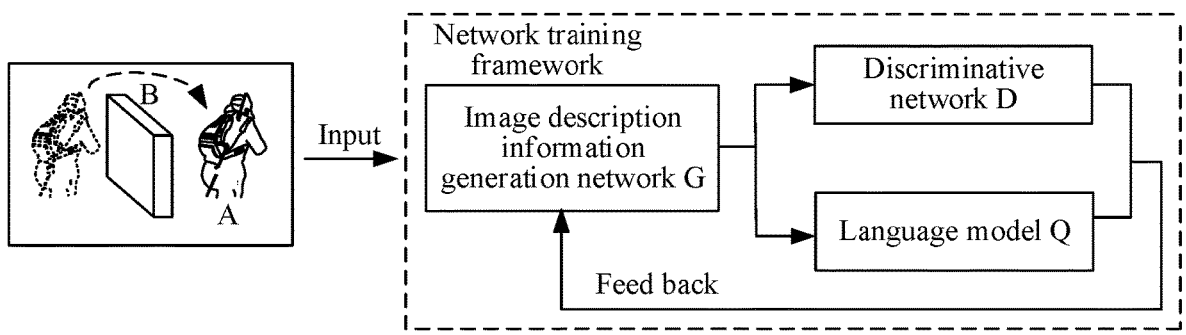
FIG. 4 is a schematic diagram of another image description information generation method according to an embodiment of the present disclosure.

A network training framework constructed for performing adversarial training in one embodiment may be illustration in FIG. 4, in which sample images are sequentially inputted into the network training framework, an image description information generation network G generates sample image description generation information corresponding to the sample images; the sample image description generation information is sent to a discriminative network D for discrimination, and sent to a language model Q for obtaining corresponding evaluation scores; and a feedback coefficient r used for adjusting the image description information generation network G is obtained according to a discrimination result p of the discriminative network D and an evaluation scores s of the language model Q, so that the image description information generation network is trained and optimized based on r, and further the discriminative network D is trained and optimized by using the trained and optimized image description information generation network. By analogy, the image description information generation network G and the discriminative network D are trained alternately, to obtain a final converged target-image description information generation network.

The language model may include one or more index parameters, such as BLEU, ROUGE, METEOR, CIDEr, and SPICE, used for evaluating generation quality of image description generation information. The parameters are correlated to human subjective evaluation of image description generation information. Therefore, a comprehensive evaluation score of the parameters can objectively reflect generation quality of the image description generation information.

Optionally, the initialized image description information generation network constructed in one embodiment may include: a CNN, an attention serialization language model Attention, and an RNN. The CNN is configured to extract image features in an image, the Attention is a mechanism used for updating weights in a serialization language model, and the RNN is configured to learn of context features.

Figure 5:
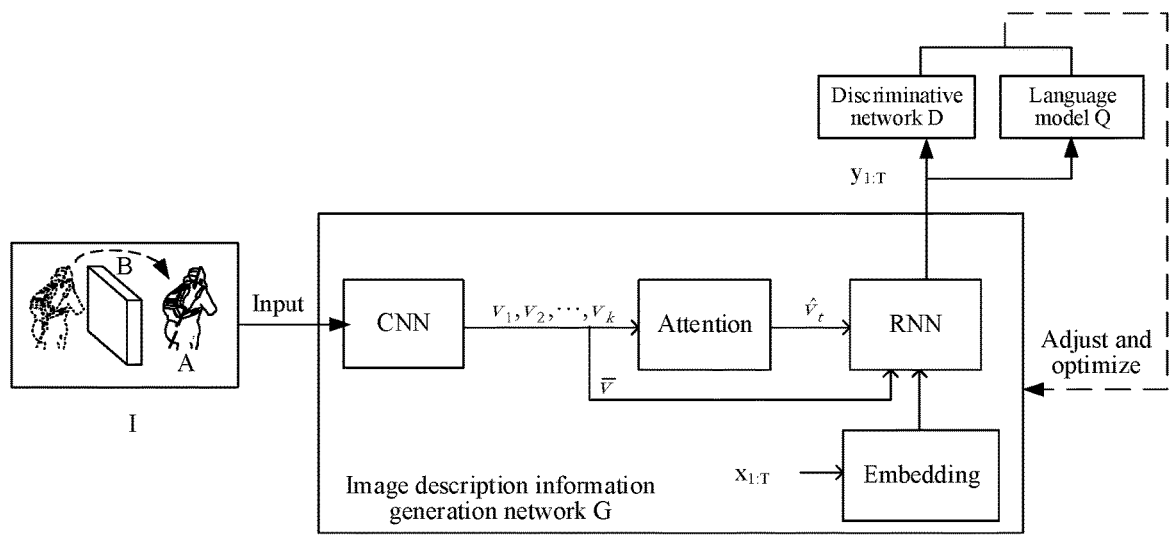
FIG. 5 is a schematic diagram of still another image description information generation method according to an embodiment of the present disclosure.

For example, as shown in FIG. 5, it is assumed that a sample image is an image I, and corresponding sample image description information is $x_{1:T}$. The image I is inputted into the CNN, and the CNN extracts local eigenvectors, for example, $\{v_1, v_2, \ldots, v_k | k=\{10, 11, 12, \ldots, 100\}\}$, and a global eigenvector $\bar{v}$ of the image I. The local eigenvectors are inputted into the Attention for weighted average processing to obtain $\hat{v}_t$. $\hat{v}_t$ is correlated to a time point t. $\hat{v}_t$ and $\bar{v}$ are inputted into the RNN, and $x_{1:T}$ is inputted into the RNN by using a word embedding matrix Embedding. Subsequently, an output result of the RNN is used as image description generation information $y_{1:T}$ that is generated by an image description information generation network and that matches the image I, and is inputted into the discriminative network D and the language model Q, to adjust and optimize the image description information generation network G through alternate training. In one embodiment, the word embedding matrix Embedding is a model for linear transformation.

In one embodiment, the CNN may be an improved version of the R-CNN (namely, a Faster R-CNN). A backbone network of the CNN is Resnet101, which may be pre-trained in an MS COCO dataset and a Visual Genome dataset. The attention serialization language model Attention adopts a soft attention policy, to perform weighted average processing on image vectors of each image. The RNN may be a double-layer LSTM network structure.

Optionally, the initialized discriminative network constructed in one embodiment may include one of the followings.

1) A first initialized discriminative network based on a CNN structure. In the first initialized discriminative network, an eigenvector outputted by the CNN is inputted into a first multi-layer perception (MLP) and a first classification network (for example, softmax), to obtain through conversion a probability value used for indicating a discrimination result. The CNN may include M layers of convolution kernels. Convolution kernels of the $i^{th}$ layer in the M layers of convolution kernels are configured to perform a convolution operation on a sample image vector of the sample image according to the $i^{th}$ size, where i is a positive integer less than or equal to M.

2) A second initialized discriminative network based on an RNN structure. In the second initialized discriminative network, an eigenvector outputted by the RNN is inputted into a second MLP and a second classification network (for example, softmax), to obtain through conversion a probability value used for indicating a discrimination result. The RNN may include a standard N-layer LSTM network.

In one embodiment, in an adversarial training process, the image description information generation network G generates image description generation information corresponding to an image; the image description generation information is sent to the discriminative network D for discrimination, and sent to the language model Q for obtaining a corresponding evaluation score; and then a feedback coefficient r used for adjusting the image description information generation network G is obtained according to a discrimination result p of the discriminative network D and an evaluation score s of the language model Q, so that the image description information generation network is trained and optimized based on r. Calculation manners of the feedback coefficient r may include, but are not limited to:

$$r = \lambda \cdot p + (1-\lambda) \cdot s \quad (1)$$

where $\lambda$ is a weighted average coefficient.

After the obtained target image is inputted into the to-be-trained image description information generation network and the to-be-trained discriminative network based on the foregoing formula (1), the feedback coefficient r is obtained, and the image description information generation network is adjusted and optimized according to a value of the feedback coefficient r. Further, the discriminative network is adjusted and optimized by using an output result of the adjusted image description information generation network. Convergence is finally achieved through alternate training, thereby obtaining the target-image description information generation network.

In one embodiment, the to-be-processed target image is learned by using the target-image description information generation network obtained through adversarial training of the network training framework shown in the foregoing accompanying drawing, to generate improved and optimized target-image description information matching the target image, thereby improving generation quality of the image description information.

Through the embodiments provided in the present disclosure, the target-image description information generation network obtained based on adversarial training is used. A discriminative network is introduced in an adversarial training process, to discriminate the output result of the image description information generation network; and the image description information generation network and the discriminative network are trained alternately, to implement reinforcement learning of a finally generated target-image description information generation network. Therefore, comprehensive optimization of evaluation indexes of image description information generated by using the target-image description information generation network is implemented, thereby improving generation quality of the image description information.

In an optional solution, before the obtaining a to-be-processed target image, the method further includes the following steps:

S1: Construct the initialized image description information generation network and the initialized discriminative network.

S2: Perform adversarial training of the initialized image description information generation network and the initialized discriminative network, to obtain the target-image description information generation network.

In one embodiment, before the obtaining a to-be-processed target image, the initialized image description information generation network and the initialized discriminative network need to be first constructed. Subsequently, the initialized image description information generation network and the initialized discriminative network need to be pre-trained, and then adversarial training is performed on the pre-trained image description information generation network and the pre-trained discriminative network.

In an optional construction manner, the initialized image description information generation network may be constructed based on an R-CNN, an attention serialization language model, and an RNN having a double-layer LSTM network. For example, for the constructed framework of the initialized image description information generation network, reference may be made to the image description information generation network G shown in FIG. 5.

In an optional construction manner, the initialized discriminative network may include, but is not limited to: a CNN-type discriminative network and an RNN-type discriminative network. The CNN-type network may be a first initialized discriminative network constructed based on a CNN, a first MLP, and a first classification network; and the RNN-type discriminative network may be a second initialized discriminative network constructed based on an RNN, a second MLP, and a second classification network.

Further, in one embodiment, after the initialized image description information generation network and the initialized discriminative network are constructed, the initialized image description information generation network and the initialized discriminative network are pre-trained, and steps may be as follows.

For example, it is assumed that an initialized image description information generation network $G_0$, an initialized discriminative network $D_0$, and a pre-training set S are obtained, where $S=\{(I, x_{1:T})\}$. $G_0$ is pre-trained on the training set S by using a maximum likelihood method MLE, to obtain $G_\theta$ that is pre-trained. A pre-training set $S_D$ is generated by using $G_\theta$, where $S_D=\{(I, x_{1:T}), (I, y_{1:T}), (I, \hat{x}_{1:T})\}$.

Subsequently, $D_0$ is pre-trained on $S_D$ to obtain $D_\phi$. $\theta$ and $\phi$ are respectively parameters determined through training in the image description information generation network G and the discriminative network D.

Further, alternate training is started by using $G_\theta$ that is pre-trained and $D_\phi$ that is pre-trained, to implement adversarial training of two neural networks, thereby optimizing generation quality of the image description information generation network G.

Through the embodiments provided in the present disclosure, the initialized image description information generation network and the initialized discriminative network are constructed, and adversarial training of the constructed initialized image description information generation network and the constructed initialized discriminative network is performed, to implement mutual restriction and training, thereby optimizing and improving generation quality of the image description information generation network.

In an optional solution, constructing the initialized discriminative network includes the following steps.

1) Construct a first initialized discriminative network based on a CNN, a first MLP, and a first classification network, the first MLP and the first classification network being configured to convert an eigenvector outputted by the CNN structure into a probability value, the CNN including M layers of convolution kernels, convolution kernels of the $i^{th}$ layer in the M layers of convolution kernels being configured to perform a convolution operation on a sample image vector of the sample image according to the $i^{th}$ size, i being a positive integer less than or equal to M, and the sample image vector being determined according to image eigenvectors of the sample image and word eigenvectors included in sample image description information corresponding to the sample image.

The MLP may be a forward triggered neural network structure. Nodes in two adjacent layers are fully connected. There is no connection between nodes in the same layer, and there is no cross-layer connection.

Figure 6:
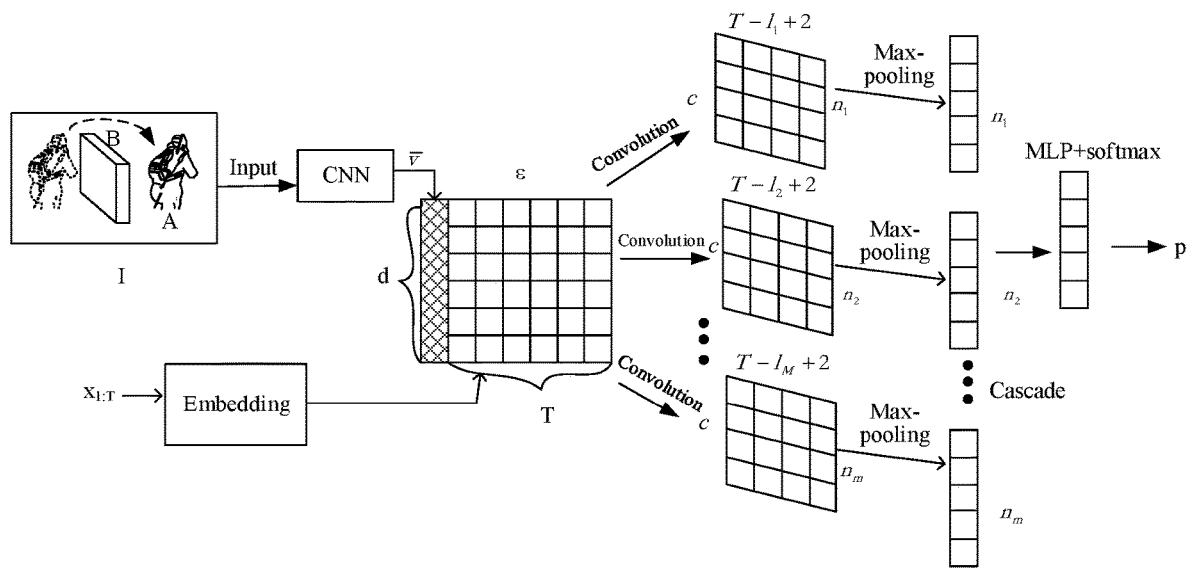
FIG. 6 is a schematic diagram of still another image description information generation method according to an embodiment of the present disclosure.

Specifically, description is made with reference to FIG. 6. The first initialized discriminative network includes the CNN structure having M layers of convolution kernels, the first MLP, and the first classification network. Convolution kernels of each of the M layers are configured to indicate a size used for performing a convolution operation. For example, for the convolution kernels of the $i^{th}$ layer, convolution is performed based on the $i^{th}$ size, and there are $n_i$ corresponding convolution kernels. The first MLP and the first classification network (for example, softmax) are configured to convert an output result of the M layers of convolution kernels, to obtain a probability value used for indicating a discrimination result.

For example, it is assumed that a sample image is an image I, and sample image description information corresponding to the image I is $x_{1:T}$. The image I is inputted into the CNN to obtain a d-dimensional image eigenvector $\bar{v}$, and the sample image description information $x_{1:T}$ is simultaneously inputted into a word embedding matrix Embedding, to obtain T d-dimensional word eigenvectors. Subsequently, the T+1 eigenvectors are cascaded, to obtain a feature matrix.

$$\varepsilon = \bar{v} \oplus E \cdot x_1 \oplus E \cdot x_2 \oplus \ldots \oplus E \cdot x_T \qquad (2)$$

where $\varepsilon \in R^{d \times (T+1)}$, and then convolution is performed on $\varepsilon$ by using convolution kernels w of different sizes, to obtain new eigenvectors.

$$c = [c_1, c_2, \ldots, c_{T-l+2}] \qquad (3)$$

where $$c_i = ReLU(w * \varepsilon_{i:i+l-1} + b) \qquad (4)$$

The M layers of convolution kernels have M different sizes, and there are $n_i$ convolution kernels of the $i^{th}$ size. In other words, there are $$\sum_{i=1}^{M} n_i$$

convolution kernels w of different sizes in total. Assuming that T=16, window sizes and quantities of convolution kernels may be shown in Table 1.

TABLE 1

| T | (Window size, quantity of convolution kernels) |
|---|---|
| 16 | (1,100)(2,200)(3,200)(4,200) (5,200)(6,200)(7,100)(8,100) (9,100)(10,100)(15,160)(16,160) |

Further, after the new eigenvectors c are obtained, max-pooling is performed on the eigenvectors c, and all the eigenvectors c are cascaded to obtain a new eigenvector $\tilde{c} \in R^{n \times 1}$ ($n = \sum_{i=1}^{M} n_i$). Subsequently, conversion is performed by using an MLP of a high way structure, where the structure is as follows:

$$\begin{cases} \tau = \sigma(W_T \cdot \tilde{c} + b_T) \\ H = ReLU(W_H \cdot \tilde{c} + b_H) \\ \tilde{C} = \tau \circ H + (1 - \tau) \circ \tilde{c} \end{cases} \quad (5)$$

where the parameters $W_T$, $b_T$, $\sigma$, $W_H$, and $b_H$ are parameters that need to be determined in a training process.

Finally, a probability value used for discriminating whether the image description generation information that is generated by the image description information generation network and that matches the image I is true or not is outputted by using a fully-connected layer and a sigmoid function:

$$p = \sigma(W_o \cdot \tilde{C} + b_o) \quad (6)$$

2) Construct a second initialized discriminative network based on an RNN, a second MLP, and a second classification network, the second MLP and the second classification network being configured to convert an eigenvector outputted by an RNN structure into a probability value, the RNN structure including N layers of LSTM networks, N being determined according to a sample image vector of the sample image, the sample image vector being determined according to image eigenvectors of the sample image and word eigenvectors included in sample image description information corresponding to the sample image.

Figure 7:
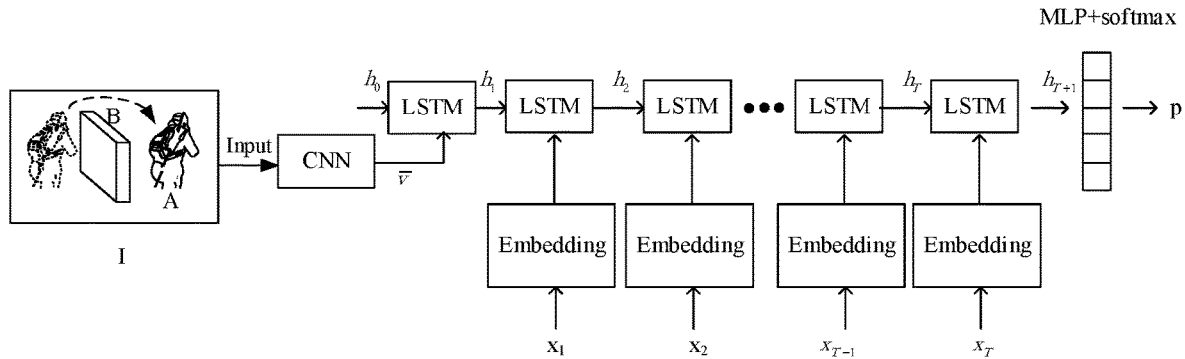
FIG. 7 is a schematic diagram of still another image description information generation method according to an embodiment of the present disclosure.

Specifically, description is made with reference to FIG. 7. The second initialized discriminative network includes the RNN having N layers of LSTM, the second MLP, and the second classification network (for example, softmax). The second MLP and the second classification network softmax are configured to convert an output result of the N layers of LSTM, to obtain a probability value used for indicating a discrimination result.

For example, it is assumed that a sample image is an image I, and sample image description information corresponding to the image I is $x_{1:T}$. The image I is inputted into the RNN to obtain a d-dimensional image eigenvector $\bar{v}$ as an input of a first layer of LSTM. A corresponding word eigenvector in the sample image description information $x_{1:T}$ is then separately inputted into each layer of LSTM, to obtain a corresponding hidden vector $h_t$.

$$h_t = \begin{cases} LSTM(\bar{v}, h_{t-1}) & t = 1 \\ LSTM(E \cdot x_{t-1}, h_{t-1}) & t = 2, 3, \ldots, T+1 \end{cases} \quad (7)$$

Finally, a probability value used for discriminating whether the image description generation information that is generated by the image description information generation network and that matches the image I is true or not is outputted by using a fully-connected layer and a sigmoid layer:

$$p = \sigma(W_R \cdot h_{t+1} + b_R) \quad (8)$$

where the parameters $W_R$, $b_R$, and $\sigma$ are parameters that need to be determined in a training process.

Through the embodiments provided in the present disclosure, a discriminative network and an image description information generation network are introduced for performing adversarial training, to improve generation quality of the image description information generation network. Two construction structures for the discriminative network are provided in one embodiment, and are respectively a CNN-based structure and an RNN-based structure. Discriminative networks of different structures make an adversarial training process more diversified, thereby helping improve a training effect.

In an optional solution, constructing the initialized image description information generation network includes the following steps:

S1: Construct the initialized image description information generation network by using an R-CNN, an attention serialization language model, and a double-layer LSTM network, the R-CNN being configured to extract local eigenvectors and a global eigenvector from the sample image, the attention serialization language model being configured to perform weighted average processing on the local eigenvectors, to obtain an average eigenvector, and the double-layer LSTM network being configured to obtain a to-be-discriminated object vector by using the average eigenvector and the global eigenvector, and input the to-be-discriminated object vector into the initialized discriminative network.

In one embodiment, the RNN may be a top-down model. The model is a double-layer LSTM network, and performs cross inputting and outputting in a training process. In one embodiment, the to-be-discriminated object vector may include a hidden vector $h_t^2$ outputted by the double-layer LSTM network.

Figure 8:
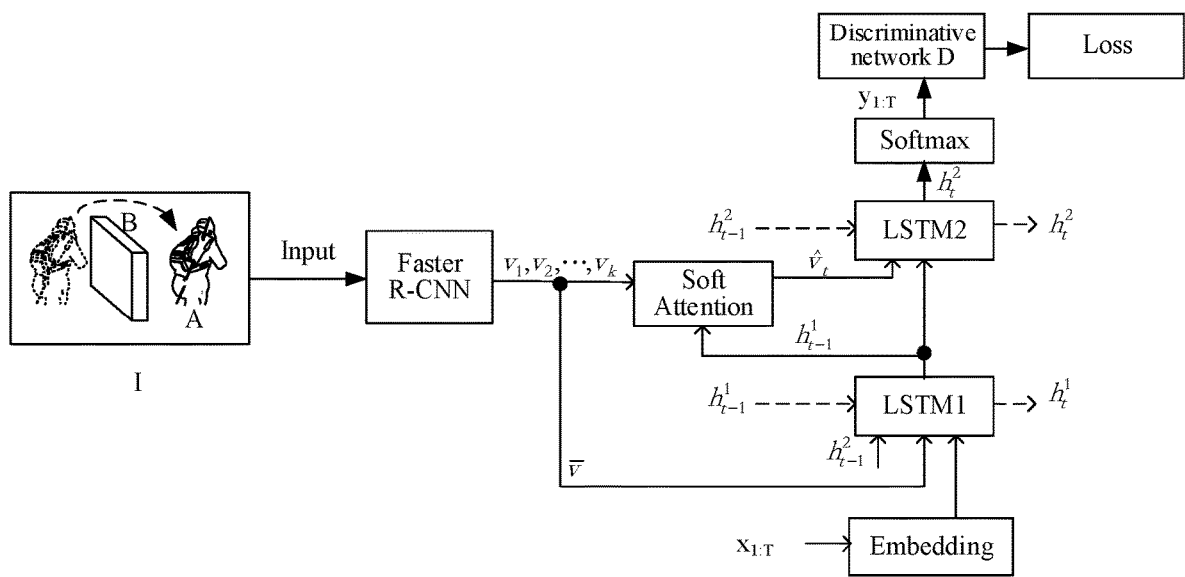
FIG. 8 is a schematic diagram of still another image description information generation method according to an embodiment of the present disclosure.

Specifically, description is made with reference to FIG. 8. It is assumed that a sample image is an image I, and corresponding sample image description information is $x_{1:T}$. The image I is inputted into a Faster R-CNN, and the Faster R-CNN extracts local eigenvectors, for example, $\{v_1, v_2, \ldots, v_k | k = \{10, 11, 12, \ldots, 100\}\}$, and a global eigenvector $\bar{v}$ of the image I. The local eigenvectors are inputted into Soft Attention for weighted average processing, to obtain $\hat{v}_t$. $\hat{v}_t$ is correlated to a time point t. $\bar{v}$ is inputted into a first layer LSTM1 in the RNN, and $x_{1:T}$ is inputted into the first layer LSTM1 in the RNN by using a word embedding matrix Embedding. $\hat{v}_t$ is inputted into a second layer LSTM2 of the RNN. The LSTM1 determines a hidden vector at a current time point t according to hidden vectors at a previous time point t−1. For example, the first layer LSTM1 determines a hidden vector $h_t^1$ according to a hidden vector $h_{t-1}^1$ and a hidden vector $h_{t-1}^2$, and the second layer LSTM2 determines a hidden vector $h_t^2$ according to a hidden vector $h_{t-1}^1$ and a hidden vector $h_{t-1}^2$. The output $h_{t-1}^1$ of the LSTM1 is used for training a weight in Soft Attention, and the output $h_t^2$ of the LSTM2 is outputted into the discriminative network D through a softmax layer. In addition, a loss corresponding to this training can further be calculated, and the loss is to be used for alternate training to adjust and optimize the image description information generation network G. In one embodiment, the word embedding matrix Embedding is a model for linear transformation.

Through the embodiments provided in the present disclosure, an initialized image description information generation network is constructed by using an R-CNN, an attention serialization language model, and a double-layer LSTM network, and then a discriminative network is introduced based on the initialized image description information generation network for alternate training, to help optimize and improve the image description information generation network, thereby resolving a problem that generation quality of image description information generated based on a CNN-RNN structure is relatively low in the related art.

In an optional solution, the performing adversarial training of the initialized image description information generation network and the initialized discriminative network, to obtain the target-image description information generation network includes:

S10: Perform following operations repeatedly until the target-image description information generation network is obtained:

S12: Determine a current image description information generation network and a current discriminative network, an initial value of the current image description information generation network being the initialized image description information generation network, and an initial value of the current discriminative network being the initialized discriminative network.

S14: Obtain the sample image and sample image description information corresponding to the sample image;

S16: Input the sample image and the sample image description information into a current image description information generation network, to obtain sample image description generation information matching the sample image or sample image reference description information matching the sample image, a first matching degree between the sample image description generation information and the sample image being greater than a second matching degree between the sample image reference description information and the sample image.

S18: Determine to-be-discriminated sample description information in the sample image description information, the sample image description generation information, or the sample image reference description information.

S20: Input the sample image and the to-be-discriminated sample description information into the current discriminative network, to obtain a sample discrimination probability value and a sample feedback coefficient.

S22: In a case that the sample feedback coefficient indicates that the sample discrimination probability value does not meet a convergence condition, adjust the current image description information generation network according to the sample discrimination probability value, to obtain a trained image description information generation network, and adjust the current discriminative network according to the trained image description information generation network, to obtain a trained discriminative network; use the trained image description information generation network as the current image description information generation network, and use the trained discriminative network as the current discriminative network; and use the current image description information generation network as the target-image description information generation network in a case that the sample feedback coefficient indicates that the sample discrimination probability value meets the convergence condition.

Specifically, description is provided with reference to the example shown in FIG. 9. It is assumed that an obtained sample image is an image I, and corresponding sample image description information is $x_{1:T}$. For the network frameworks of the current image description information generation network and the current discriminative network, the constructed frameworks in the foregoing examples are used as an example.

The image I is inputted into a Faster R-CNN in the current image description information generation network, and the Faster R-CNN extracts local eigenvectors, for example, $\{v_1, v_2, \ldots, v_k | k=\{10, 11, 12, \ldots, 100\}\}$, and a global eigenvector $\bar{v}$ of the image I. The local eigenvectors are inputted into Soft Attention for weighted average processing, to obtain $\hat{v}_t$. $\hat{v}_t$ is correlated to a time point t. The global eigenvector $\bar{v}$ used as an image eigenvector of the image I is separately inputted into a double-layer LSTM network and a discriminative network D. The sample image description information $x_{1:T}$ is inputted into a word embedding matrix Embedding in the current image description information generation network, to obtain word eigenvectors corresponding to the image I. The image eigenvector and the word eigenvectors form image vectors used for identifying features of the image I.

Further, during a process in which adversarial training is performed based on the foregoing constructed network frameworks, the current discriminative network D obtains a positive sample $\{(I,x_{1:T})\}$ and negative samples $\{(I,y_{1:T})\}$ and $\{(I,\hat{x}_{1:T})\}$. The positive sample $\{(I,x_{1:T})\}$ is obtained according to the image I and the sample image description information $x_{1:T}$; the negative sample $\{(I,y_{1:T})\}$ is obtained according to the image I and sample image description generation information $y_{1:T}$ generated by the current image description information generation network G; and $\{(I,\hat{x}_{1:T})\}$ is obtained according to the image I and sample image reference description information $\hat{x}_{1:T}$ generated by the current image description information generation network G. The sample image reference description information $\hat{x}_{1:T}$ is image description information that is generated by the current image description information generation network G and that has description quality different from that of the sample image description generation information $y_{1:T}$. For example, an expression sequence of the sample image reference description information $\hat{x}_{1:T}$ is different from that of the sample image description generation information $y_{1:T}$, or an expression habit of the sample image reference description information $\hat{x}_{1:T}$ is different from that of the sample image description generation information $y_{1:T}$. A matching degree between the sample image description generation information $y_{1:T}$ and the image I is higher than a matching degree between the sample image reference description information $\hat{x}_{1:T}$ and the image I. In other words, generation quality of the sample image description generation information $y_{1:T}$ is higher than that of the sample image reference description information $\hat{x}_{1:T}$.

Subsequently, the current discriminative network D randomly selects a sample from the positive sample and the negative samples as to-be-discriminated sample description information, and discriminates the to-be-discriminated sample description information, to obtain a sample discrimination probability value p. Further, a language model Q also calculates a corresponding evaluation score s. A sample feedback coefficient r is calculated by using the sample discrimination probability value p and the evaluation score s, and a parameter in the current image description information generation network G is adjusted and optimized based on r, to implement training of the current image description information generation network.

In a case that the sample feedback coefficient indicates that the sample discrimination probability value does not meet a convergence condition, a current image description information generation network $G_k$ is adjusted according to the sample discrimination probability value p, to obtain a trained image description information generation network $G_{k+1}$, and a current discriminative network $D_k$ is adjusted according to the trained image description information generation network $G_{k+1}$, to obtain a trained discriminative network $D_{k+1}$. Subsequently, the trained image description information generation network $G_{k+1}$ is used as the current image description information generation network $G_k$, and the trained discriminative network $D_{k+1}$ is as the current discriminative network $D_k$. The training is continued by repeating the foregoing steps. In a case that the sample feedback coefficient r indicates that the sample discrimination probability value p meets a convergence condition, the current image description information generation network $G_k$ is used as a target-image description information generation network $G_{target}$.

Through the embodiments provided in the present disclosure, after a current image description information generation network and a current discriminative network are determined, the current image description information generation network and the current discriminative network are trained alternately repeatedly, to implement adversarial training and optimization, until a target-image description information generation network whose image description information generation quality is improved is obtained. Therefore, a problem that description quality of image description information obtained through simple encoding and decoding operations performed on an image merely by using an RNN-CNN structure is relatively low in the related art is resolved, and image description quality is further improved.

In an optional solution, before the adjusting the current image description information generation network according to the sample discrimination probability value, to obtain a trained image description information generation network, and adjusting the current discriminative network according to the trained image description information generation network, to obtain a trained discriminative network, the method further includes:

S1: Determine the sample discrimination probability value outputted by the current discriminative network.

S2: Obtain the first matching degree between the sample image description generation information and the sample image by using a language model, the language model including one or more parameters used for evaluating the sample image description generation information.

S3: Perform weighted average processing on the sample discrimination probability value and the first matching degree, to obtain the sample feedback coefficient.

The language model may include one or more index parameters, such as BLEU, ROUGE, METEOR, CIDEr, and SPICE, used for evaluating generation quality of image description generation information. The parameters are correlated to human subjective evaluation for image description generation information. Therefore, a comprehensive evaluation score of the parameters can be used for indicating a correlation, for example, a matching degree, between the sample image description generation information and the sample image. Further, the matching degree may be used for objectively reflecting generation quality of the image description generation information.

Specifically, description is made with reference to the example shown in FIG. 9. In an adversarial training process, an image description information generation network G generates image description generation information $y_{1:T}$ corresponding to an image I; the image description generation information $y_{1:T}$ is sent to a discriminative network D for discrimination, and sent to a language model Q for obtaining a corresponding evaluation score. Subsequently, a sample feedback coefficient r used for adjusting the image description information generation network G is obtained according to a discrimination result p of the discriminative network D and an evaluation score s of the language model Q, so that the image description information generation network is trained and optimized based on r. Calculation manners of the sample feedback coefficient r may include, but are not limited to:

$$r = \lambda \cdot p + (1-\lambda) \cdot s \qquad (9)$$

where $\lambda$ is a weighted average coefficient.

Through the embodiments provided in the present disclosure, content for adjustment and optimization on an image description information generation network is jointly determined based on a discriminative network and a language model, which helps to improve training quality of the image description information generation network. Therefore, target-image description information generated by a target-image description information generation network finally obtained through training has higher quality, thereby helping to objectively and accurately reflect content in an image.

In an optional solution, the adjusting the current image description information generation network according to the sample discrimination probability value, to obtain a trained image description information generation network includes the following step:

1: Adjust a parameter in at least one of the following structures in the current image description information generation network according to the sample discrimination probability value: a current R-CNN, a current attention serialization language model, and a current double-layer LSTM network.

In one embodiment, in a case that the image description information generation network is constructed based on an R-CNN, an attention serialization language model, and a double-layer LSTM network, in an adversarial training process, the adjusted parameter in the image description information generation network includes a parameter in at least one of the following structures: the current R-CNN, the current attention serialization language model, and the current double-layer LSTM network. In other words, in the adversarial training process, a parameter in at least one structure, but not limited thereto, may be adjusted and optimized, to ensure higher generation quality of the image description information generation network obtained through training.

In an optional solution, the adjusting the current discriminative network according to the trained image description information generation network, to obtain a trained discriminative network includes the following steps:

1: Obtain sample image description generation information after training or sample image reference description information after training that is outputted by the trained image description information generation network.

2: Adjust a parameter in a CNN structure in the current discriminative network by using the sample image description information, the sample image description generation information after training, or the sample image reference description information after training, to obtain the trained discriminative network.

In one embodiment, in a case that the discriminative network is constructed based on a CNN structure, in the adversarial training process, adjustment and optimization may be performed on the parameters in the CNN structure in the discriminative network by using to-be-discriminated sample description information randomly selected from the sample image description information, the sample image description generation information after training, or the sample image reference description information after training, to perform joint training of the discriminative network and the image description information generation network.

In an optional solution, the adjusting the current discriminative network according to the trained image description information generation network, to obtain a trained discriminative network includes the following steps:

1: Obtain sample image description generation information after training or sample image reference description information after training that is outputted by the trained image description information generation network.

2: Adjust a parameter in an RNN structure in the current discriminative network by using the sample image description information, the sample image description generation information after training, or the sample image reference description information after training, to obtain the trained discriminative network.

In one embodiment, in a case that the discriminative network is constructed based on an RNN structure, in the adversarial training process, adjustment and optimization may be performed on the parameters in the RNN structure in the discriminative network by using to-be-discriminated sample description information randomly selected from the sample image description information, the sample image description generation information after training, or the sample image reference description information after training, to perform joint training of the discriminative network and the image description information generation network.

Details are described with reference to the following example. It is assumed that an image description generation network $G_\theta$, a discriminative network $D_\varphi$, a language model Q, and a training set $S=\{(I,x_{1:T})\}$ are obtained. Adversarial training is performed through the following steps, to obtain an optimal parameter θ of the image description generation network $G_\theta$ and an optimal parameter φ of the discriminative network $D_\varphi$.

S1: Randomly obtain $G_\theta$ and $D_\varphi$ that are initialized.

S2: Pre-train $G_\theta$ on a training set S by using an MLE method.

S3: Generate a pre-training set $S_D=\{(I,x_{1:T}), (I,y_{1:T}), (I,\hat{x}_{1:T})\}$ by using a pre-trained $G_\theta$.

S4: Pre-train $D_\varphi$ on $S_D$.

S5: Perform the following steps repeatedly until a convergence condition is met.

S6: For g-steps=1:g do.

S7: Generate a mini-batch $\{(I,y_{1:T})\}$ by using $G_\theta$.

S8: Calculate a value of p by using $D_\varphi$.

S9: Calculate a value of s by using Q.

S10: Calculate a value of r with reference to $D_\varphi$ and Q.

S11: Update a parameter θ by using the reinforcement learning method self-critical.

S12: End.

S13: For d-steps=1:d do.

S14: Generate a negative sample $\{(I,y_{1:T})\}$ by using $G_\theta$, and combine a negative sample $\{(I,\hat{x}_{1:T})\}$ and a positive sample $\{(I,x_{1:T})\}$.

S15: Update the parameter φ.

S16: End.

Optionally, through the foregoing adversarial training, parameters may be determined as the following: λ=0.3, Q=CIDErD, g=1, and d=1. The description herein is merely an example, and no limitation is imposed in one embodiment.

As shown in FIG. 10, correlations between objective evaluation indexes (BLEU, ROUGE, METEOR, CIDEr, and SPICE) and a subjective evaluation index of a user are provided. It can be seen that SPICE has a highest correlation with the evaluation index of the user, METEOR and CIDEr also have relatively high correlations with the evaluation index of the user, and for BLEU and ROUGE, the correlations are relatively low.

There is an obvious improvement in generation quality of target-image description information generated by the target-image description information generation network provided in the embodiments of the present disclosure. The image description generation frameworks in the embodiments of the present disclosure may alternatively be applied to other image description algorithms based on reinforcement learning and training. Specifically, FIG. 11 and FIG. 12 show comparison results of all evaluation indexes. In FIG. 11, columns respectively represents different objective evaluation standards of BLEU, METEOR, ROUGE, CIDEr, and SPICE, and CNN-D and RNN-D in the last two columns are respectively discrimination results of the target-image description information generation network obtained based on a CNN discriminator and the target-image description information generation network obtained based on an RNN discriminator that are provided in the embodiments of the present disclosure. None means a training method without using a GAN, and a CNN-GAN and an RNN-GAN are respectively results of training by using the CNN discriminator and the RNN discriminator. Ensemble is an integration result of 4 CNN-GAN models and 4 RNN-GAN models. From the comparison results in FIG. 11, it can be seen that values of all objective indexes can be effectively improved by using the training method in the embodiments of the present disclosure. The increases vary from 1.28% to 13.93%. FIG. 12 shown test results of various algorithms on an MS COCO contest list, and from the last row it can be seen that generation quality of the solutions provided in the embodiments of the present disclosure has been comprehensively optimized.

For simple descriptions, the foregoing method embodiments are stated as a series of action combinations. However, a person skilled in the art shall appreciate that the present disclosure is not limited to the sequence of the described actions, because according to the present disclosure, some steps may be performed in another order or may be simultaneously performed. In addition, a person skilled in the art is further to understand that the embodiments described in this specification are exemplary embodiments, and the involved actions and modules mentioned are not necessarily required by the present disclosure.

Figure 13:
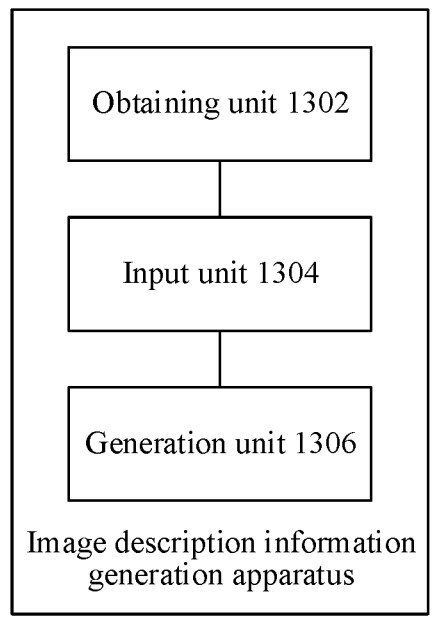
FIG. 13 is a schematic structural diagram of an image description information generation apparatus according to an embodiment of the present disclosure.

According to another aspect of the embodiments of the present disclosure, an image description information generation apparatus for performing the foregoing image description information generation method is further provided. In an embodiment, the image description information generation apparatus may be applied to a hardware environment shown in FIG. 1. Optionally, as shown in FIG. 13, the apparatus may include:

1) an obtaining unit 1302, configured to obtain a to-be-processed target image;

2) an input unit 1304, configured to input the target image into a target-image description information generation network, the target-image description information generation network being a generation network that is obtained after adversarial training performed by using a plurality of sample images and that is configured to generate image description information, the adversarial training being alternate training that is performed based on an initialized image description information generation network and an initialized discriminative network that match the target-image description information generation network, the discriminative network being configured to discriminate an output result of the image description information generation network; and 3) a generation unit 1306, configured to generate, according to the output result of the target-image description information generation network, target-image description information used for describing the target image.

Figure 14:
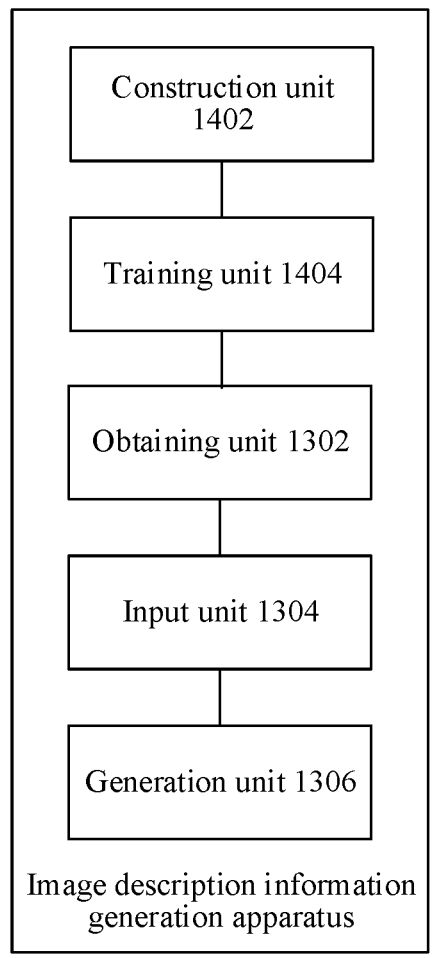
FIG. 14 is a schematic structural diagram of another image description information generation apparatus according to an embodiment of the present disclosure.

In one embodiment, the image description information generation apparatus may be applied to scenarios, such as an image recognition scenario, an image retrieval scenario, and an image verification scenario, in which image description information matching image content presented in an image needs to be obtained. As an optional solution, as shown in FIG. 14, the apparatus further includes:

1) a construction unit 1402, configured to: before the obtaining a to-be-processed target image, construct the initialized image description information generation network and the initialized discriminative network; and 2) a training unit 1404, configured to perform adversarial training of the initialized image description information generation network and the initialized discriminative network, to obtain the target-image description information generation network.

In an optional solution, the construction unit 1402 includes a first construction module and a second construction module.

1) The first construction module is configured to construct a first initialized discriminative network based on a CNN structure, a first MLP, and a first classification network, the first MLP and the first classification network being configured to convert an eigenvector outputted by the CNN structure into a probability value, the CNN structure including M layers of convolution kernels, convolution kernels of the $i^{th}$ layer in the M layers of convolution kernels being configured to perform a convolution operation on a sample image vector of the sample image according to the $i^{th}$ size, i being a positive integer less than or equal to M, and the sample image vector being determined according to image eigenvectors of the sample image and word eigenvectors included in sample image description information corresponding to the sample image.

The MLP may be a forward triggered neural network structure. Nodes in two adjacent layers are fully connected. There is no connection between nodes in the same layer, and there is no cross-layer connection.

For a structure of the first initialized discriminative network, reference may be made to the foregoing related description of FIG. 6, and details are not described herein again. 2) The second construction module is configured to construct a second initialized discriminative network based on an RNN structure, a second MLP, and a second classification network, the second MLP and the second classification network being configured to convert an eigenvector outputted by the RNN structure into a probability value, the RNN structure including N layers of LSTM networks, N being determined according to a sample image vector of the sample image, the sample image vector being determined according to image eigenvectors of the sample image and word eigenvectors included in sample image description information corresponding to the sample image.

For a structure of the second initialized discriminative network, reference may be made to the foregoing related description of FIG. 7. Details are not described herein again.

In an optional solution, the construction unit 1402 includes: 1) a third construction module, configured to construct the initialized image description information generation network by using an R-CNN, an attention serialization language model, and a double-layer LSTM network, the R-CNN being configured to extract local eigenvectors and a global eigenvector from the sample image, the attention serialization language model being configured to perform weighted average processing on the local eigenvectors, to obtain an average eigenvector, and the double-layer LSTM network being configured to obtain a to-be-discriminated object vector by using the average eigenvector and the global eigenvector, and input the to-be-discriminated object vector into the initialized discriminative network.

For a specific implementation of the third construction module, reference may be made to the foregoing related description of FIG. 8, and details are not described herein again. In an optional solution, the training unit 1404 includes:

1) a processing module, configured to perform following operations repeatedly until the target-image description information generation network is obtained:

S1: Determine a current image description information generation network and a current discriminative network, an initial value of the current image description information generation network being the initialized image description information generation network, and an initial value of the current discriminative network being the initialized discriminative network.

S2: Obtain the sample image and sample image description information corresponding to the sample image.

S3: Input the sample image and the sample image description information into the current image description information generation network, to obtain sample image description generation information matching the sample image or sample image reference description information matching the sample image, a first matching degree between the sample image description generation information and the sample image being greater than a second matching degree between the sample image reference description information and the sample image.

S4: Determine to-be-discriminated sample description information in the sample image description information, the sample image description generation information, or the sample image reference description information.

S5: Input the sample image and the to-be-discriminated sample description information into the current discriminative network, to obtain a sample discrimination probability value and a sample feedback coefficient.

S6: In a case that the sample feedback coefficient indicates that the sample discrimination probability value does not meet a convergence condition, adjust the current image description information generation network according to the sample discrimination probability value, to obtain a trained image description information generation network, and adjust the current discriminative network according to the trained image description information generation network, to obtain a trained discriminative network; use the trained image description information generation network as the current image description information generation network, and use the trained discriminative network as the current discriminative network; and use the current image description information generation network as the target-image description information generation network in a case that the sample feedback coefficient indicates that the sample discrimination probability value meets the convergence condition.

For a specific implementation process of the processing module, reference may be made to the foregoing related description of FIG. 9, and details are not described herein again.

In an optional solution, the training unit 1404 further includes:

1) a determining module, configured to: before the adjusting the current image description information generation network according to the sample discrimination probability value, to obtain a trained image description information generation network, and adjusting the current discriminative network according to the trained image description information generation network, to obtain a trained discriminative network, determine the sample discrimination probability value outputted by the current discriminative network;

2) an obtaining module, configured to obtain the first matching degree between the sample image description generation information and the sample image by using a language model, the language model including one or more parameters used for evaluating the sample image description generation information; and 3) a weighted average processing module, configured to perform weighted average processing on the sample discrimination probability value and the first matching degree, to obtain the sample feedback coefficient.

For a specific implementation of the language model, reference may be made to the foregoing related description, and details are not described herein again.

For a specific implementation process of the training unit, reference may be made to the foregoing related description of FIG. 9, and details are not described herein again.

In an optional solution, the training unit implements the adjusting the current image description information generation network according to the sample discrimination probability value, to obtain a trained image description information generation network through the following step:

S1: Adjust a parameter in at least one of the following structures in the current image description information generation network according to the sample discrimination probability value: a current R-CNN, a current attention serialization language model, and a current double-layer LSTM network.

In an optional solution, the training unit implements the adjusting the current discriminative network according to the trained image description information generation network to obtain a trained discriminative network through the following steps:

S1: Obtain sample image description generation information after training or sample image reference description information after training that is outputted by the trained image description information generation network.

S2: Adjust a parameter in a CNN structure in the current discriminative network by using the sample image description information, the sample image description generation information after training, or the sample image reference description information after training, to obtain the trained discriminative network.

In an optional solution, the training unit implements the adjusting the current discriminative network according to the trained image description information generation network to obtain a trained discriminative network through the following steps:

S1: Obtain sample image description generation information after training or sample image reference description information after training that is outputted by the trained image description information generation network.

S2: Adjust a parameter in an RNN structure in the current discriminative network by using the sample image description information, the sample image description generation information after training, or the sample image reference description information after training, to obtain the trained discriminative network.

Figure 15:
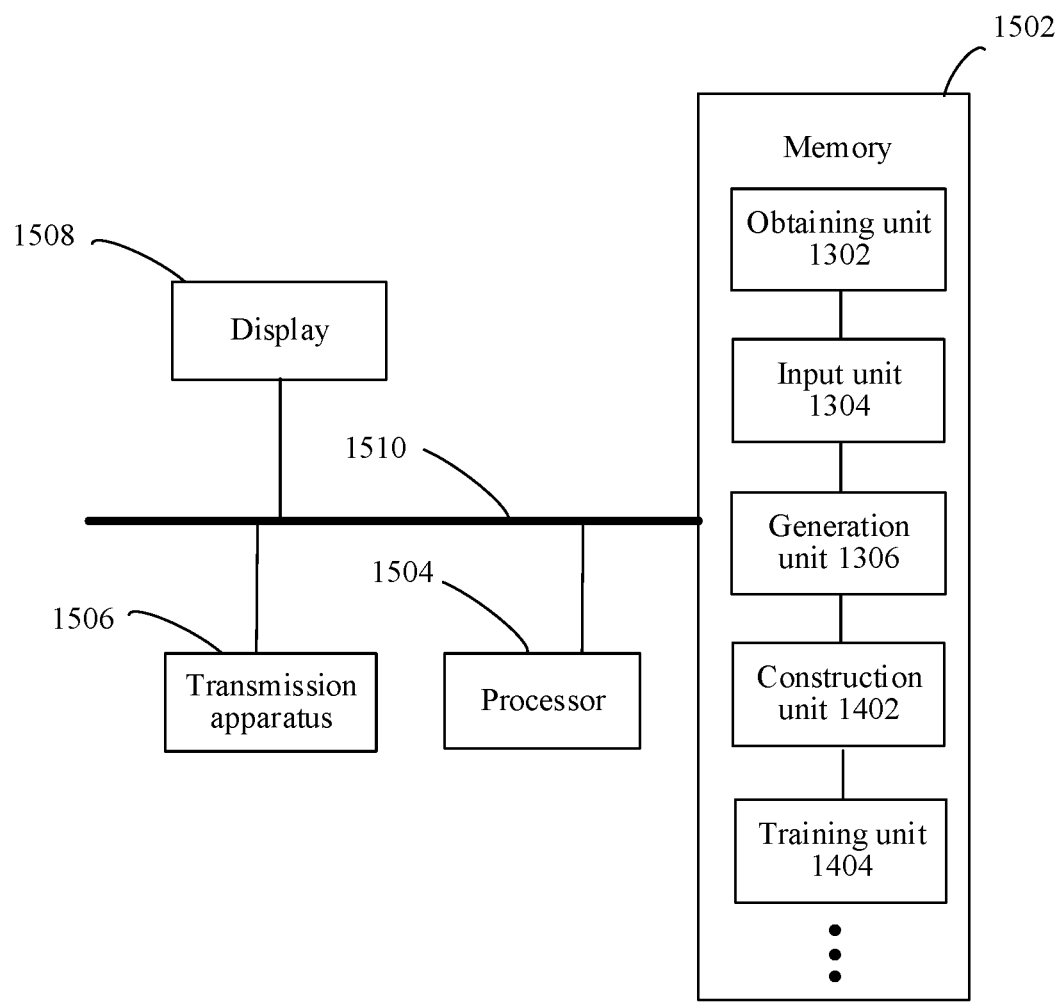
FIG. 15 is a schematic structural diagram of an electronic device according to an embodiment of the present disclosure.

For specific implementation of the units and modules in the image description information generation apparatus provided in one embodiment of the present disclosure, reference may be made to the related descriptions of the image description information generation method provided in the embodiments of the present disclosure. According to still another aspect of the embodiments of the present disclosure, an electronic device for performing the foregoing image description information generation method is further provided. As shown in FIG. 15, the electronic device includes a memory 1502 and a processor 1504, the memory 1502 storing a computer program, and the processor 1504 being configured to perform steps in any one of the foregoing method embodiments by using the computer program.

In one embodiment, the foregoing electronic device may be located in at least one of a plurality of network devices in a computer network.

In one embodiment, the processor may be configured to perform the following steps by using the computer program:

S1: Obtain a to-be-processed target image.

S2: Input the target image into a target-image description information generation network, the target-image description information generation network being a generation network that is obtained after adversarial training performed by using a plurality of sample images and that is configured to generate image description information, the adversarial training being alternate training that is performed based on an initialized image description information generation network and an initialized discriminative network that match the target-image description information generation network, the discriminative network being configured to discriminate an output result of the image description information generation network.

S3: Generate, according to the output result of the target-image description information generation network, target-image description information used for describing the target image.

Optionally, a person of ordinary skill in the art may understand that, the structure shown in FIG. 15 is only illustrative. The electronic device may be a terminal device such as a smartphone (for example, an Android mobile phone or an iOS mobile phone), a tablet computer, a palmtop computer, a mobile Internet device (MID), or a PAD. FIG. 15 does not limit the structure of the foregoing electronic device. For example, the electronic device may further include more or fewer components (such as a network interface) than those shown in FIG. 15, or have configuration different from that shown in FIG. 15.

The memory 1502 may be configured to store a software program and a module, for example, a program instruction/module corresponding to the image description information generation method and apparatus in the embodiments of the present disclosure, and the processor 1504 performs various functional applications and data processing by running a software program and a module stored in the memory 1502, that is, implementing the image description information generation method. The memory 1502 may include a high speed random access memory, and may further include a non-volatile memory, for example, one or more magnetic storage apparatuses, a flash memory, or another non-volatile solid-state memory. In some examples, the memory 1502 may further include memories remotely disposed relative to the processor 1504, and these remote memories may be connected to a terminal through a network. Examples of the network include but are not limited to, the Internet, an intranet, a local area network, a mobile communication network, and a combination thereof. The memory 1502 may specifically be configured to store information such as sample feature of an object and a target virtual resource account. In an example, as shown in FIG. 15, the memory 1502 may include an obtaining unit 1302, an input unit 1304, a generation unit 1306, a construction unit 1402, and a training unit 1404 in the foregoing image description information generation apparatus. In addition, the memory may further include other modules or units in the image description information generation apparatus, and details are not described in this example again.

Optionally, the transmission apparatus 1506 is configured to receive or transmit data by using a network. Specific examples of the network may include a wired network and a wireless network. In an example, the transmission apparatus 1506 includes a network interface controller (NIC), which may be connected to another network device and router by using a cable, so as to communicate with the Internet or a local area network. In an example, the transmission apparatus 1506 is a radio frequency (RF) module, which communicates with the Internet in a wireless manner.

In addition, the foregoing electronic device further includes: a display 1508, configured to display the to-be-processed target image and target-image description information; and a connection bus 1510, configured to connect various module components in the foregoing electronic device.

According to still another aspect of the embodiments of the present disclosure, a storage medium is further provided. The storage medium stores a computer program, the computer program being configured to perform, when run, steps in any one of the foregoing method embodiments.

In one embodiment, the storage medium may be configured to store a computer program used for performing the following steps:

S1: Obtain a to-be-processed target image.

S2: Input the target image into a target-image description information generation network, the target-image description information generation network being a generation network that is obtained after adversarial training performed by using a plurality of sample images and that is configured to generate image description information, the adversarial training being alternate training that is performed based on an initialized image description information generation network and an initialized discriminative network that match the target-image description information generation network, the discriminative network being configured to discriminate an output result of the image description information generation network.

S3: Generate, according to the output result of the target-image description information generation network, target-image description information used for describing the target image.

In one embodiment, a person of ordinary skill in the art may understand that all or some of the steps of the methods in the foregoing embodiments may be implemented by a program instructing relevant hardware of a terminal device. The program may be stored in a computer-readable storage medium. The storage medium may include a flash disk, a read-only memory (ROM), a random access memory (RAM), a magnetic disk, an optical disc, and the like.

The sequence numbers of the foregoing embodiments of the present disclosure are merely for illustrative purposes, and are not intended to indicate priorities of the embodiments.

In a case that the integrated unit in the foregoing embodiments is implemented in the form of a software functional unit and sold or used as an independent product, the integrated unit may be stored in the foregoing computer-readable storage medium. Based on such an understanding, the technical solutions of the present disclosure essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of the present disclosure.

In the foregoing embodiments of the present disclosure, the descriptions of the embodiments have their respective focuses. For a part that is not described in detail in an embodiment, reference may be made to related descriptions in other embodiments.

In the several embodiments provided in the present disclosure, it is to be understood that the disclosed client may be implemented in another manner. For example, the described apparatus embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

Accordingly, in the embodiments of the present disclosure, after a to-be-processed target image is obtained, the target image is inputted into a target-image description information generation network obtained through adversarial training, and target-image description information matching the target image is generated by using the target-image description information generation network. In other words, image description information of an image is no longer generated by using a CNN-RNN structure provided in the related art, and instead a target-image description information generation network that is obtained based on adversarial training is used. A discriminative network is introduced in an adversarial training process, to discriminate an output result of an image description information generation network; and the image description information generation network and the discriminative network are trained alternately, to implement reinforcement learning of a finally generated target-image description information generation network. Therefore, comprehensive optimization of evaluation indexes of image description information generated by using the target-image description information generation network is implemented, thereby improving generation quality of the image description information, and resolving a technical problem that generation quality is relatively low in an image description information generation method provided in the related art.

The foregoing descriptions are exemplary embodiments of the present disclosure. A person of ordinary skill in the art may make several improvements and refinements without departing from the principle of the present disclosure, and the improvements and refinements shall fall within the protection scope of the present disclosure.

What is claimed is:

1. An image description information generation method, comprising:
   constructing an initialized image description information generation network and an initialized discriminative network;
   performing adversarial training of the initialized image description information generation network and the initialized discriminative network, to obtain a target-image description information generation network, comprising: performing the following steps repeatedly until the target-image description information generation network is obtained:
      obtaining a sample image and sample image description information corresponding to the sample image;
      inputting the sample image and the sample image description information into a current image description information generation network, to obtain sample image description generation information of the sample image and sample image reference description information of the sample image, wherein a first matching degree between the sample image description generation information and the sample image is greater than a second matching degree between the sample image reference description information and the sample image, and an initial value of the current image description information generation network is the initialized image description information generation network;
      determining to-be-discriminated sample description information in the sample image description information, the sample image description generation information, and the sample image reference description information;
      inputting the sample image and the to-be-discriminated sample description information into a current discriminative network, to obtain a sample discrimination probability value and a sample feedback coefficient, wherein an initial value of the current discriminative network is the initialized discriminative network;
      adjusting the current image description information generation network according to the sample discrimination probability value when the sample feedback coefficient indicates that the sample discrimination probability value does not meet a convergence condition, to obtain a trained image description information generation network; adjusting the current discriminative network according to the trained image description information generation network to obtain a trained discriminative network; returning to the operation of obtaining the sample image and the sample image description information corresponding to the sample image, and continuing to train the trained image description information generation network and the trained discriminative network; and
      using the current image description information generation network as the target-image description information generation network when the sample feedback coefficient indicates that the sample discrimination probability value meets the convergence condition;
   obtaining a to-be-processed target image;
   inputting the target image into the target-image description information generation network; and
   according to the output result of the target-image description information generation network, generating target-image description information used for describing the target image.

2. The method according to claim 1, wherein the constructing the initialized discriminative network comprises:
   constructing a CNN-related initialized discriminative network based on a convolutional neural network (CNN), a CNN-related multi-layer perception (MLP), and a CNN-related classification network, wherein the CNN-related MLP and the CNN-related classification network are configured to convert an eigenvector outputted by the CNN into a probability value, the CNN comprises M layers of convolution kernels, convolution kernels of the $i^{th}$ layer in the M layers of convolution kernels are configured to perform a convolution operation on a sample image vector of the sample image according to the $i^{th}$ size, i being a positive integer less than or equal to M, and the sample image vector is determined according to image eigenvectors of the sample image and word eigenvectors comprised in sample image description information corresponding to the sample image; or
   constructing an RNN-related initialized discriminative network based on a recurrent neural network (RNN), an RNN-related MLP, and an RNN-related classification network, wherein the RNN-related MLP and the RNN-related classification network are configured to convert an eigenvector outputted by the RNN into a probability value, the RNN comprises N layers of long-short term memory (LSTM) networks, N being determined according to a sample image vector of the sample image, and the sample image vector is determined according to image eigenvectors of the sample image and word eigenvectors comprised in sample image description information corresponding to the sample image.

3. The method according to claim 2, wherein the constructing the initialized image description information generation network comprises:

constructing the initialized image description information generation network by using a region-based CNN (R-CNN), an attention serialization language model, and a double-layer LSTM network, wherein the R-CNN is configured to extract local eigenvectors and a global eigenvector from the sample image, the attention serialization language model is configured to perform weighted average processing on the local eigenvectors, to obtain an average eigenvector, and the double-layer LSTM network is configured to obtain a to-be-discriminated object vector by using the average eigenvector and the global eigenvector, and input the to-be-discriminated object vector into the initialized discriminative network.

4. The method according to claim 1, wherein before the adjusting the current image description information generation network according to the sample discrimination probability value, and adjusting the current discriminative network according to the trained image description information generation network, the method further comprises:
   determining the sample discrimination probability value outputted by the current discriminative network;
   obtaining the first matching degree between the sample image description generation information and the sample image by using a language model; and
   performing weighted average processing on the sample discrimination probability value and the first matching degree, to obtain the sample feedback coefficient.

5. The method according to claim 1, wherein the adjusting the current image description information generation network according to the sample discrimination probability value comprises:
   adjusting a parameter in at least one of the following structures in the current image description information generation network according to the sample discrimination probability value: a current R-CNN, a current attention serialization language model, and a current double-layer LSTM network.

6. The method according to claim 1, wherein the adjusting the current discriminative network according to the trained image description information generation network to obtain a trained discriminative network comprises:
   obtaining sample image description generation information after training or sample image reference description information after training that is outputted by the trained image description information generation network; and
   adjusting a parameter in a CNN structure in the current discriminative network by using the sample image description information, the sample image description generation information after training, or the sample image reference description information after training, to obtain the trained discriminative network.

7. The method according to claim 1, wherein the adjusting the current discriminative network according to the trained image description information generation network to obtain a trained discriminative network comprises:
   obtaining sample image description generation information after training or sample image reference description information after training that is outputted by the trained image description information generation network; and
   adjusting a parameter in an RNN structure in the current discriminative network by using the sample image description information, the sample image description generation information after training, or the sample image reference description information after training, to obtain the trained discriminative network.

8. The method according to claim 1, wherein inputting the sample image and the to-be-discriminated sample description information into the current discriminative network comprises:
   using a combination of the sample image and the sample image description information as a positive sample of the current discriminative network;
   using a combination of the sample image and the sample image description generation information as a first negative sample of the current discriminative network; and
   using a combination of the sample image and the sample image reference description information as a second negative sample of the current discriminative network.

9. The method according to claim 1, wherein:
   an expression sequence or an expression habit of the sample image reference description information is different from that of the sample image description generation information.

10. An electronic device, comprising:
   at least one memory storing computer program instructions; and
   at least one processor coupled to the at least one memory and, when executing the computer program instructions, configured to perform:
   constructing an initialized image description information generation network and an initialized discriminative network;
   performing adversarial training of the initialized image description information generation network and the initialized discriminative network, to obtain a target-image description information generation network, comprising: performing the following steps repeatedly until the target-image description information generation network is obtained:
      obtaining a sample image and sample image description information corresponding to the sample image;
      inputting the sample image and the sample image description information into a current image description information generation network, to obtain sample image description generation information of the sample image and sample image reference description information of the sample image, wherein a first matching degree between the sample image description generation information and the sample image is greater than a second matching degree between the sample image reference description information and the sample image, and an initial value of the current image description information generation network is the initialized image description information generation network;
      determining to-be-discriminated sample description information in the sample image description information, the sample image description generation information, and the sample image reference description information;
      inputting the sample image and the to-be-discriminated sample description information into a current discriminative network, to obtain a sample discrimination probability value and a sample feedback coefficient, wherein an initial value of the current discriminative network is the initialized discriminative network;
      adjusting the current image description information generation network according to the sample discrimination probability value when the sample feedback coefficient indicates that the sample discrimination probability value does not meet a convergence condition, to obtain a trained image description information generation network; adjusting the current discriminative network according to the trained image description information generation network to obtain a trained discriminative network; returning to the operation of obtaining the sample image and the sample image description information corresponding to the sample image, and continuing to train the trained image description information generation network and the trained discriminative network; and using the current image description information generation network as the target-image description information generation network when the sample feedback coefficient indicates that the sample discrimination probability value meets the convergence condition;

obtaining a to-be-processed target image;

inputting the target image into the target-image description information generation network; and according to the output result of the target-image description information generation network, generating target-image description information used for describing the target image.

11. The electronic device according to claim 10, wherein the constructing the initialized discriminative network comprises:

constructing a CNN-related initialized discriminative network based on a convolutional neural network (CNN), a CNN-related multi-layer perception (MLP), and a CNN-related classification network, wherein the CNN-related MLP and the CNN-related classification network are configured to convert an eigenvector outputted by the CNN into a probability value, the CNN comprises M layers of convolution kernels, convolution kernels of the $i^{th}$ layer in the M layers of convolution kernels are configured to perform a convolution operation on a sample image vector of the sample image according to the $i^{th}$ size, i being a positive integer less than or equal to M, and the sample image vector is determined according to image eigenvectors of the sample image and word eigenvectors comprised in sample image description information corresponding to the sample image, or constructing an RNN-related initialized discriminative network based on a recurrent neural network (RNN), an RNN-related MLP, and an RNN-related classification network, wherein the RNN-related MLP and the RNN-related classification network are configured to convert an eigenvector outputted by the RNN into a probability value, the RNN comprises N layers of long-short term memory (LSTM) networks, N being determined according to a sample image vector of the sample image, and the sample image vector is determined according to image eigenvectors of the sample image and word eigenvectors comprised in sample image description information corresponding to the sample image.

12. The electronic device according to claim 11, wherein the constructing the initialized image description information generation network comprises:

constructing the initialized image description information generation network by using a region-based CNN (R-CNN), an attention serialization language model, and a double-layer LSTM network, wherein the R-CNN is configured to extract local eigenvectors and a global eigenvector from the sample image, the attention serialization language model is configured to perform weighted average processing on the local eigenvectors, to obtain an average eigenvector, and the double-layer LSTM network is configured to obtain a to-be-discriminated object vector by using the average eigenvector and the global eigenvector, and input the to-be-discriminated object vector into the initialized discriminative network.

13. The electronic device according to claim 10, wherein before the adjusting the current image description information generation network according to the sample discrimination probability value, and adjusting the current discriminative network according to the trained image description information generation network, the at least one processor is further configured to perform:

determining the sample discrimination probability value outputted by the current discriminative network;

obtaining the first matching degree between the sample image description generation information and the sample image by using a language model; and performing weighted average processing on the sample discrimination probability value and the first matching degree, to obtain the sample feedback coefficient.

14. The electronic device according to claim 10, wherein the adjusting the current image description information generation network according to the sample discrimination probability value comprises:

adjusting a parameter in at least one of the following structures in the current image description information generation network according to the sample discrimination probability value: a current R-CNN, a current attention serialization language model, and a current double-layer LSTM network.

15. The electronic device according to claim 10, wherein the adjusting the current discriminative network according to the trained image description information generation network to obtain a trained discriminative network comprises:

obtaining sample image description generation information after training or sample image reference description information after training that is outputted by the trained image description information generation network; and adjusting a parameter in a CNN structure in the current discriminative network by using the sample image description information, the sample image description generation information after training, or the sample image reference description information after training, to obtain the trained discriminative network.

16. The electronic device according to claim 10, wherein the adjusting the current discriminative network according to the trained image description information generation network to obtain a trained discriminative network comprises:

obtaining sample image description generation information after training or sample image reference description information after training that is outputted by the trained image description information generation network; and adjusting a parameter in an RNN structure in the current discriminative network by using the sample image description information, the sample image description generation information after training, or the sample image reference description information after training, to obtain the trained discriminative network.

17. A non-transitory computer-readable storage medium storing computer program instructions executable by at least one processor to perform:

constructing an initialized image description information generation network and an initialized discriminative network;

performing adversarial training of the initialized image description information generation network and the initialized discriminative network, to obtain a target-image description information generation network, comprising: performing the following steps repeatedly until the target-image description information generation network is obtained:

obtaining a sample image and sample image description information corresponding to the sample image;

inputting the sample image and the sample image description information into a current image description information generation network, to obtain sample image description generation information of the sample image and sample image reference description information of the sample image, wherein a first matching degree between the sample image description generation information and the sample image is greater than a second matching degree between the sample image reference description information and the sample image, and an initial value of the current image description information generation network is the initialized image description information generation network;

determining to-be-discriminated sample description information in the sample image description information, the sample image description generation information, and the sample image reference description information;

inputting the sample image and the to-be-discriminated sample description information into a current discriminative network, to obtain a sample discrimination probability value and a sample feedback coefficient, wherein an initial value of the current discriminative network is the initialized discriminative network;

adjusting the current image description information generation network according to the sample discrimination probability value when the sample feedback coefficient indicates that the sample discrimination probability value does not meet a convergence condition, to obtain a trained image description information generation network; adjusting the current discriminative network according to the trained image description information generation network to obtain a trained discriminative network; returning to the operation of obtaining the sample image and the sample image description information corresponding to the sample image, and continuing to train the trained image description information generation network and the trained discriminative network; and using the current image description information generation network as the target-image description information generation network when the sample feedback coefficient indicates that the sample discrimination probability value meets the convergence condition;

obtaining a to-be-processed target image;

inputting the target image into the target-image description information generation network; and according to the output result of the target-image description information generation network, generating target-image description information used for describing the target image.

\* \* \* \* \*